United States Patent
Suh et al.

(10) Patent No.: US 11,170,455 B2
(45) Date of Patent: Nov. 9, 2021

(54) ENERGY MANAGEMENT APPARATUS AND OPERATION METHOD THEREOF

(71) Applicant: LG ELECTRONICS INC., Seoul (KR)

(72) Inventors: Eunjung Suh, Seoul (KR); Wookjin Park, Seoul (KR); Haengwoon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 177 days.

(21) Appl. No.: 16/479,826

(22) PCT Filed: Jan. 16, 2018

(86) PCT No.: PCT/KR2018/000763
§ 371 (c)(1),
(2) Date: Jul. 22, 2019

(87) PCT Pub. No.: WO2018/139798
PCT Pub. Date: Aug. 2, 2018

(65) Prior Publication Data
US 2021/0133899 A1 May 6, 2021

(30) Foreign Application Priority Data

Jan. 26, 2017 (KR) ........................ 10-2017-0012893

(51) Int. Cl.
*G05B 15/02* (2006.01)
*G06Q 50/06* (2012.01)
*G06F 1/28* (2006.01)

(52) U.S. Cl.
CPC ............. *G06Q 50/06* (2013.01); *G05B 15/02* (2013.01); *G06F 1/28* (2013.01)

(58) Field of Classification Search
CPC ............ G06Q 50/06; G06F 1/28; G05B 15/02
See application file for complete search history.

(56) References Cited

U.S. PATENT DOCUMENTS

| | | | | | |
|---|---|---|---|---|---|
| 2011/0307112 | A1* | 12/2011 | Barrilleaux | .......... | H05B 47/105 700/291 |
| 2012/0143356 | A1* | 6/2012 | Berg-Sonne | ........... | G05B 15/02 700/49 |
| 2013/0103622 | A1* | 4/2013 | Matsuoka | ........... | H04L 12/2803 706/12 |

(Continued)

FOREIGN PATENT DOCUMENTS

| JP | 2013-126212 A | 6/2013 |
|---|---|---|
| JP | 2014-017542 A | 1/2014 |

(Continued)

*Primary Examiner* — Gary Collins
(74) *Attorney, Agent, or Firm* — Dentons US LLP

(57) ABSTRACT

An energy management apparatus, according to an embodiment of the present invention, comprises: a storage unit for storing an operation schedule of the energy management apparatus; a sensing unit for detecting a control signal of at least one energy apparatus in a system including the energy management apparatus; and a control unit for determining whether temporary patterns pass a preset criterion by counting the temporary patterns corresponding to the detected control signal, and updating the operation schedule such that the temporary patterns are added on the basis of determination results.

12 Claims, 16 Drawing Sheets

(56) References Cited

U.S. PATENT DOCUMENTS

2014/0058567 A1* 2/2014 Matsuoka ............... F24F 11/30
700/276

FOREIGN PATENT DOCUMENTS

| KR | 10-2002-0082779 A | 10/2002 |
| --- | --- | --- |
| KR | 10-2010-0095971 A | 9/2010 |
| KR | 10-1585531 B1 | 1/2016 |

* cited by examiner

| CLASSIFICATION | COUNT | SEARCH PERIOD |
|---|---|---|
| FIRST TEMPORARY PATTERN | 34 | 2016.11.07 ~ 2016.12.26 |
| SECOND TEMPORARY PATTERN | 5 | 2016.11.25 ~ 2016.12.23 |
| THIRD TEMPORARY PATTERN | 9 | 2016.11.05 ~ 2016.12.25 |
| ⋮ | ⋮ | ⋮ |

FIG. 8

November / December 2016

| | | 1 | 2 | 3 | 4 | 5 |
|---|---|---|---|---|---|---|
| | | | | | | THIRD TEMPORARY PATTERN |
| 6 | 7 | 8 | 9 | 10 | 11 | 12 |
| THIRD TEMPORARY PATTERN | FIRST TEMPORARY PATTERN | FIRST TEMPORARY PATTERN | FIRST TEMPORARY PATTERN | FIRST TEMPORARY PATTERN | FIRST TEMPORARY PATTERN | THIRD TEMPORARY PATTERN |
| 13 | 14 | 15 | 16 | 17 | 18 | 19 |
| | FIRST TEMPORARY PATTERN | FIRST TEMPORARY PATTERN | FIRST TEMPORARY PATTERN | FIRST TEMPORARY PATTERN | FIRST TEMPORARY PATTERN | THIRD TEMPORARY PATTERN |
| 20 | 21 | 22 | 23 | 24 | 25 | 26 |
| THIRD TEMPORARY PATTERN | FIRST TEMPORARY PATTERN | FIRST TEMPORARY PATTERN | | FIRST TEMPORARY PATTERN | FIRST TEMPORARY PATTERN / SECOND TEMPORARY PATTERN | |
| 27 | 28 | 29 | 30 | 12/1 | 2 | 3 |
| | FIRST TEMPORARY PATTERN | FIRST TEMPORARY PATTERN | FIRST TEMPORARY PATTERN | FIRST TEMPORARY PATTERN | FIRST TEMPORARY PATTERN / SECOND TEMPORARY PATTERN | THIRD TEMPORARY PATTERN |
| 4 | 5 | 6 | 7 | 8 | 9 | 10 |
| | FIRST TEMPORARY PATTERN | FIRST TEMPORARY PATTERN | FIRST TEMPORARY PATTERN | FIRST TEMPORARY PATTERN | FIRST TEMPORARY PATTERN / SECOND TEMPORARY PATTERN | THIRD TEMPORARY PATTERN |
| 11 | 12 | 13 | 14 | 15 | 16 | 17 |
| | FIRST TEMPORARY PATTERN | FIRST TEMPORARY PATTERN | FIRST TEMPORARY PATTERN | FIRST TEMPORARY PATTERN | SECOND TEMPORARY PATTERN | |
| 18 | 19 | 20 | 21 | 22 | 23 | 24 |
| THIRD TEMPORARY PATTERN | FIRST TEMPORARY PATTERN | FIRST TEMPORARY PATTERN | FIRST TEMPORARY PATTERN | FIRST TEMPORARY PATTERN | FIRST TEMPORARY PATTERN / SECOND TEMPORARY PATTERN | |
| 25 | 26 | 27 | 28 | 29 | 30 | 31 |
| THIRD TEMPORARY PATTERN | FIRST TEMPORARY PATTERN | | | | | |

ENERGY MANAGEMENT APPARATUS AND OPERATION METHOD THEREOF

This application is a National Phase application of International Application No. PCT/KR2018/000763, filed Jan. 16, 2018, and claims the benefit of KR Patent Application No. 10-2017-0012893 filed on Jan. 26, 2017, all of which are hereby incorporated by reference in their entirety for all purposes as if fully set forth herein.

TECHNICAL FIELD

The present invention relates to an energy management apparatus and a method of operating the same and, more particularly, to an energy management apparatus configuring a smart grid and a method of operating the same.

BACKGROUND ART

Currently, a power system (power grid) for supplying power to home or offices is managed by a vertical centralized network controlled by a producer. Specifically, the supplier simply supplied an energy source such as electricity, water, gas, etc. and consumers simply used the received energy source. Accordingly, it is difficult to efficiently manage energy generation, distribution or use.

That is, the power system has a radial structure spreading from a center to the periphery to distribute energy from an energy supplier to a plurality of places of use and is centered on a one-way supplier, not on consumers.

In addition, the price information of electricity is not checked in real time, but is only checked through a power exchange. In addition, since a substantially fixed price system is used, incentives for consumers through price change cannot be used.

In such a power system, it is impossible to solve a global problem such as global warming prevention, absence of a method of coping with increase in price of raw materials of energy, an energy overconsumption suppression problem, and a stable power supply problem.

Accordingly, in order to emerge from a current power system and improve efficiency of the electricity industry through establishment of a bidirectional information transmission system between a consumer and a supplier, it is necessary to develop a smart grid. Further, it is necessary to establish a smart grid for enabling consumers to control their power demands and to develop an energy management apparatus capable of performing bidrectional communication with such a smart grid.

DISCLOSURE

Technical Problem

An object of the present invention devised to solve the problem lies in an energy management apparatus for controlling at least one energy device in a system to automatically operate according to an operation schedule, to which an extracted control pattern is applied.

Another object of the present invention devised to solve the problem lies in an energy management apparatus for selecting any one of operation schedules for each season/usage stored in an energy control database and controlling an energy device to automatically operate.

Technical Solution

An energy management apparatus according to an embodiment of the present invention can count a temporary pattern based on a control signal of an energy device and perform control to add the temporary pattern to a currently set operation schedule when the search period of the counted temporary pattern exceeds a predetermined minimum pattern search period and the accuracy of the temporary pattern is equal to or greater than a predetermined reference pattern accuracy.

An energy management apparatus according to an embodiment of the present invention can distinguishably store at least one operation schedule updated according to the extracted control pattern, thereby establishing an energy control database.

Advantageous Effects

According to various embodiments of the present invention, it is possible to prevent control of an energy device from being omitted, by extracting and registering the control pattern of the energy device in an operation schedule. That is, it is possible to accurately manage a system by reducing operation error or omission.

According to various embodiments of the present invention, it is possible to appropriately select an operation schedule for each season or usage to easily operate the system, even if a user does not manually control an energy device or extract a pattern. In addition, it is possible to prevent unnecessary energy consumption in a process of acquiring an operation schedule.

According to various embodiments of the present invention, the user can intuitively recognize the operation state of the system, by visually displaying the operation schedule.

DESCRIPTION OF DRAWINGS

FIG. 8 is a diagram illustrating a method of calculating accuracy of a temporary pattern at an energy management apparatus according to an embodiment of the present invention.

BEST MODE

The following merely illustrates the principles of the present invention. Therefore, those skilled in the art are able to devise various apparatuses which embody the principles of the invention and are included in the concept and scope of the invention although not explicitly described or shown herein. Furthermore, all of the conditional terms and embodiments listed herein are, in principle, only intended for the purpose of enabling understanding of the concepts of the present invention, and are not to be construed as being limited to such specifically listed embodiments and states.

It should be understood that not only the principles, aspects and embodiments of the invention but also the detailed description of specific embodiments thereof are intended to cover structural and functional equivalents thereof. It should be understood that such equivalents include equivalents to be developed in the future as well as equivalents currently known in the art, that is, all elements invented to perform the same functions irrespective of structure.

In the claims of this specification, components represented as means for performing the functions described in the detailed description are intended to encompass all methods for performing all types of software including firmware/microcode or a combination of circuit elements for performing the functions and are coupled with an appropriate circuit for executing the software in order to perform the functions. It should be understood that, since the invention defined by the appended claims has the functions provided by the various listed means in the manner required by the claims, any means capable of providing such functions is equivalent to that understood from this specification.

The above-described objects, features and advantages of the invention will be more readily apparent from consideration of the following detailed description relating to the accompanying drawings. Therefore, a person skilled in the art will readily understand the technical idea of the present invention. In the description of the drawings, the related art which renders the scope of the present invention unnecessarily ambiguous will be omitted and procedures or steps which can be understood by those skilled in the art will be omitted.

The suffixes "module" and "unit" for components used in the description below are assigned or mixed in consideration of easiness in writing the specification and do not have distinctive meanings or roles by themselves.

Hereinafter, an energy management apparatus and a method of operating the same according to various embodiments of the present invention will be described in detail with reference to the accompanying drawings.

Figure 1:
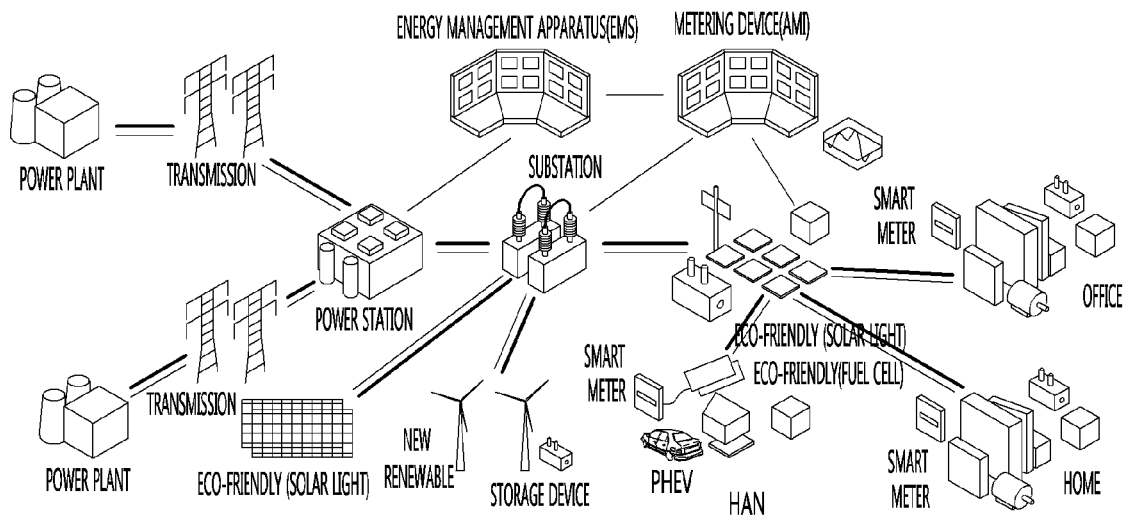
FIG. 1 is a diagram schematically showing a smart grid according to the present invention.

First, FIG. 1 is a diagram schematically showing a smart grid according to the present invention.

A smart grid is a next-generation power system capable of optimizing energy efficiency by bidirectionally exchanging real-time information between a power supplier and a consumer by combining an existing power system with information technology (IT).

The smart grid may manage an energy source such as electricity, water, gas, etc. The amount of generated or used energy source may be metered.

Accordingly, energy sources which are not described above may be included in a management object of this system. Hereinafter, electricity will be described as an energy source and the description of this specification is equally applicable to the other energy sources.

Referring to FIG. 1, the smart grid according to an embodiment includes a power plant for generating electricity. The power plant may include a power plant for generating electricity through thermal power generation or nuclear power generation and a power plant using water power, solar light or wind power as eco-friendly energy.

Electricity generated in the power plant is transmitted to a power station through a transmission line. The power station transmits electricity to a substation such that electricity is distributed to places of use such as home or offices.

In addition, electricity generated by eco-friendly energy is transmitted to a substation to be distributed to places of use. In addition, electricity transmitted by the substation is distributed to home or offices through an electricity storage device or directly.

Even in the home using a home area network (HAN), electricity is generated, stored or distributed through solar light or a fuel cell mounted in a plugin hybrid electric vehicle (PHEV) and remaining electricity may be sold to the outside (e.g., an electric power company).

In addition, the smart grid may include a smart meter for monitoring the amount of electricity used in the place of use (home or office) in real time and a metering device (an advanced metering infrastructure (AMI)) for measuring the amount of electricity used in a plurality of places of use. That is, the AMI may receive information measured by a plurality of smart meters to measure the amount of used electricity.

In this specification, metering includes metering of the smart meter and the AMI and receiving the amount of generated electricity or used electricity from another component and recognizing the amount of generated electricity or used electricity by the smart meter and the AMI.

In addition, the smart grid may further include an energy management system (EMS) for managing energy. The energy management system may generate information on operation of one or more components in association with energy (energy generation, distribution, use, storage, etc.) In addition, the energy management system may generate a command for operating at least one component. An energy management apparatus may be an energy control device configuring the energy management system.

In this specification, a function or solution performed by the energy management apparatus may be referred to as an energy management function or an energy management solution.

In the embodiment of the present invention, one or more energy management apparatuses may be provided in the smart grid as a separate configuration or may be included in one or more components as an energy management function or solution.

Figure 2:
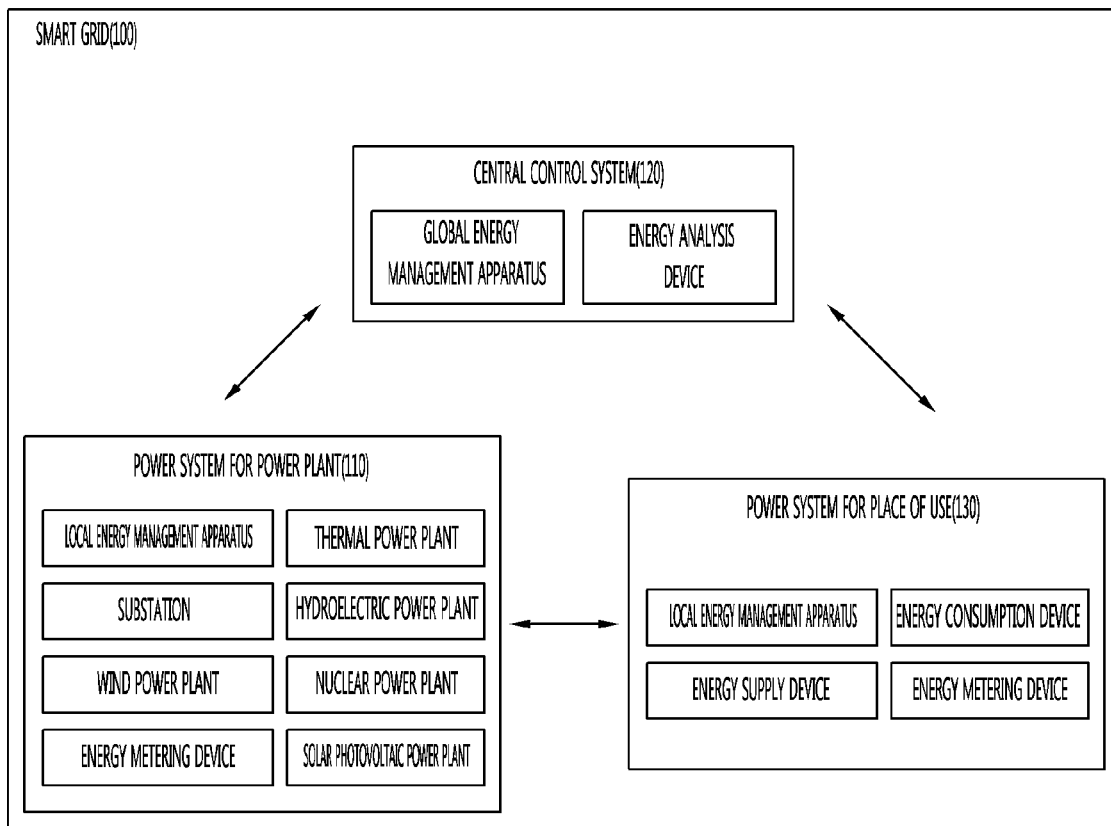
FIG. 2 is a block diagram schematically showing a smart grid according to the present invention.

FIG. 2 is a block diagram schematically showing a smart grid according to the present invention.

Referring to FIGS. 1 and 2, the smart grid 100 of the present invention includes a plurality of components. For example, a power plant, a substation, a power station, an energy management apparatus, a home appliance, a smart meter, a capacitor, a web server, a metering device, a home server, etc. may be provided as components of the smart grid. The energy management apparatus includes a local energy management apparatus and a global energy management apparatus. That is, the name of the energy management apparatus is changed according to a system to which the energy management apparatus belongs, and is not limited thereto.

In addition, in the present invention, each component may include a plurality of sub-components. For example, if one component is a home appliance, a microcomputer, a heater, a display, a motor, etc. may be included as the sub-components.

That is, in the present invention, all components for performing specific functions may be used. In addition, such components configure the smart grid of the present invention. In addition, two components may communicate with each other by a communication unit.

The smart grid 100 according to an embodiment of the present invention may include at least one power system for the power plant 110, a central control system 120 and a power system for a place of use 130.

The power system for the power plant 110 may share power information (energy information) of power plants, and the power system for the place of use 130 may share power information of electric mechanisms in the home or power information of electric mechanisms in an office. A local area system means the power system for the power plant 110 or the power system for the place of use 130.

The central control system 120 may control power information of the local area system. The global area system may mean the central control system 120. The global area system includes at least two local area systems and may be understood as the relative concept corresponding to the local area system.

The power system for the power plant 110 may include a power plant for generating power through thermal power generation, hydroelectric power generation or nuclear power generation and a solar photovoltaic power plant or a wind power plant using solar light or wind power as new renewable energy. Here, a unit configuring the power system for the power plant 110 such as a thermoelectric power plant or a hydroelectric power plant may be called a "power generation component".

Power generated by the thermal power plant, a hydroelectric power plant or a nuclear power plant is transmitted to the substation through a transmission line. The substation converts a voltage or current and distributes power to a place of use in a power system for the home/office. In addition, power generated by new renewable energy may be distributed into places of use through a substation.

The central control system 120 serves to control power supply, power consumption, power distribution and managements of a local area system in the smart grid 110, and includes a global energy management apparatus and an energy analysis (metering) device.

The global energy management apparatus serves to control local area systems. For example, the global energy management apparatus receives energy related information from the local energy management apparatus in a power network 110 for the power plant and the local energy management apparatus in the power system for the place of use 130 to enable overall energy management of the smart grid 100.

In addition, the smart grid 100 may include an energy management system (EMS). The energy management system means a system for controlling an energy management apparatus using an energy management program.

The energy management system may predict the power of each place of use in real time through communication between energy management apparatuses. The energy management system may be provided in each place of use or supplier and may be further provided in a local area system or global area system. The energy management system may be included in the energy management apparatus.

Examples of the energy management apparatus may include an automatic temperature control device, a cable set-top box, an intelligent display device, an automatic light control device, etc. Alternatively, the energy management apparatus may be provided in the form of a portable terminal to transmit and receive wireless signals to and from at least one of a base station, an external terminal and a server over a mobile communication network. Examples of the portable terminal may include a mobile phone, a smartphone, a laptop, a digital broadcast terminal, a personal digital assistant (PDA), a portable multimedia player (PMP), a navigation system, a wearable device, etc. In addition, short-range communication technology is applied to the portable terminal and Bluetooth, radio frequency identification (RFID), infrared data association (IrDA), ultrawideband (UWB), ZigBee, etc. may be used as the short-range communication technology.

The smart grid 100 may include an energy metering system. The energy metering system measures the amount of used energy from metering devices and collects and analyzes energy usage information. Examples of the metering device include electricity meters, gas meters or water meters. The energy metering device may be one component configuring the energy metering system.

The energy management apparatus and the energy metering device allow a consumer to efficiently use electricity and provide a power supplier with an ability to detect a system problem and efficiently operate the system.

For example, the real-time price signal of the electricity market is relayed through the energy management apparatus installed in each home and the energy management apparatus communicates with each electric apparatus to perform control. Therefore, a user recognizes power information of each electric apparatus through the energy management apparatus and performs power information processing such as power consumption or electric rate limit setting based on the recognized power information, thereby conserving energy and cost.

The power system for the place of use 130 may generate and consume electricity even in the home through solar light or a fuel cell mounted in a plugin hybrid electric vehicle (PHEV) and supply or sell remaining electricity to another local area system. In addition, in each local area system, the energy metering device is provided to grasp power and electric rates of the place of use in real time and the power supply unit in the local area system may recognize the amount of currently used power and the electric rates to seek for a method of reducing power consumption or electric rates according to the situation. In addition, bidirectional communication between local area systems or the units of the local area system is possible and bidirectional communication between a unit in any one local area system and a unit (component) in the other local area system is also possible. Here, the unit may include a power plant, an electricity company, a distributed power source, an energy management system, an energy metering system, an energy management apparatus or an electric apparatus. For example, bidirectional communication between the power system for the power plant 110 and the power system for the place of use 130 is possible, and electric apparatuses in the power system for the place of use 130 is also possible. Alternatively, bidirectional communication between a power plant in the power system for the power plant 110 and the energy management apparatus of the power system for the place of use 130 is also possible. Accordingly, adaptive electricity generation and distribution are possible, by monitoring the power consumption status of each place of use.

Figure 3:
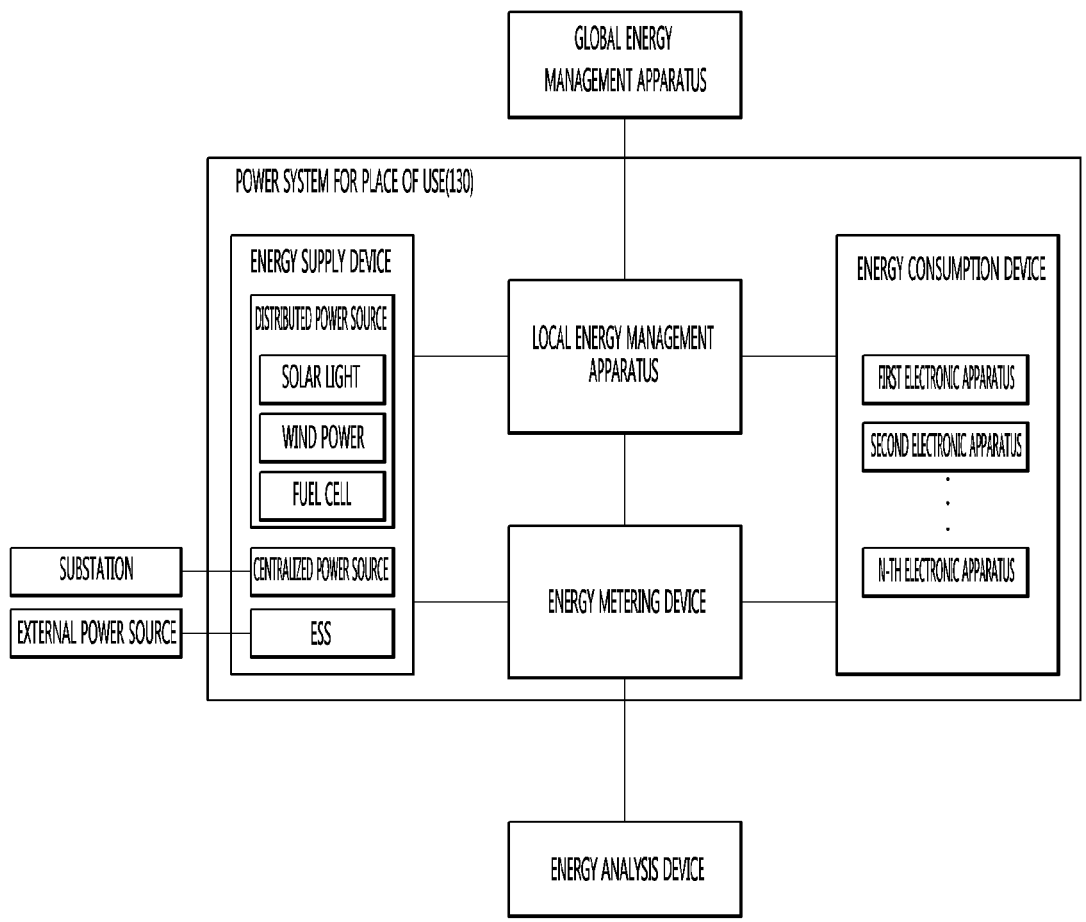
FIG. 3 is a block diagram schematically showing a power system for a place of use according to an embodiment of the present invention.

Next, FIG. 3 is a block diagram schematically showing a power system for a place of use according to an embodiment of the present invention.

The power system for the place of use 130 may correspond to one local area system of the smart grid 100. The power system for the place of use 130 may perform bidirectional communication with another local area system in the smart grid 100 and autonomously perform energy supply, consumption, storage, metering, management and communication.

The power system for the place of use 130 may roughly include an energy supply device, an energy consumption device, a local energy management apparatus and an energy metering device.

The power system for the place of use 130 may receive information on general management of the units in the power system for the place of use 130 through a public channel. For example, information which may be received through the public channel may include a unit identifier, current rate information, relative level information (e.g., high, medium, and low) of the current rate, usage information (e.g., residential or commercial), error confirmation information (e.g., CRC information), etc. In addition, a broadcast reception information for receiving the public channel may include DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), ISDB-T (Integrated Services Digital Broadcast-Terrestrial), etc.

Meanwhile, information acquired from the energy metering device may be transmitted to an external energy analysis device and information acquired from the local energy management apparatus may be transmitted to an external global energy management apparatus or another local energy management apparatus.

The energy supply device serves to supply power to all the units in the power system for the place of use 130 and may include a distributed power source, a centralized power source, and an energy storage device (Energy Storage System (ESS)).

The distributed power source means a source for supplying power other than power provided by an existing power plant, for example, power provided by another local area system or a self-power supply source (solar light, a wind power generation source, a fuel cell, etc.). The distributed power source may generate and store electricity through solar light and a PVEC and provide electricity to another local area system.

The centralized power source means an energy source for supplying power through large-scale power generation in a district heating corporation. Specifically, electricity generated in an external power plant is transmitted to a power station through a transmission line and the power station transmits electricity to a substation. The centralized power source may mean an energy source supplied through a substation. The centralized power source has high efficiency and has high initial investment.

The ESS serves to store energy received from an external power source and to distribute energy into the units in the power system for the place of use 130 if necessary.

The energy consumption device consumes energy received from the energy supply device based on a command received from the local energy management apparatus, and may include electric devices such as a home appliance, an automatic temperature control device, a cable set-top box, an automatic light control device. Examples of the energy consumption device may include home appliances (a refrigerator, a washing machine, an air conditioner, a cooker, a cleaner, a dryer, a dishwasher, a dehumidifier, a display device, a lighting device, etc.) or a heater, a motor, a display, etc. configuring the home appliance. In the present embodiment, the type of the energy consumption device is not limited.

The local energy management apparatus serves to monitor and control all the devices configuring the power system for the place of use 130. Each of the components configuring the local energy management apparatus will be described below with reference to FIG. 4.

The energy metering device is connected to the energy supply device or the energy consumption device to measure the amount of used energy and to collect and analyze energy usage information and may include electricity meters, gas meters or water meters. The information acquired from the energy metering device may be transmitted to the energy metering system. Information transmitted to the energy metering system may be transmitted to the energy analysis device in the central control system 120.

All the units of the power system for the place of use 130 may mutually perform bidirectional communication and may be controlled by the energy management apparatus.

Hereinafter, the components of the energy management apparatus according to the embodiment of the present invention will be described. The energy management apparatus means a global energy management apparatus for controlling the energy of the smart grid 100 or an energy management apparatus for controlling the energy of a local energy system.

Figure 4:
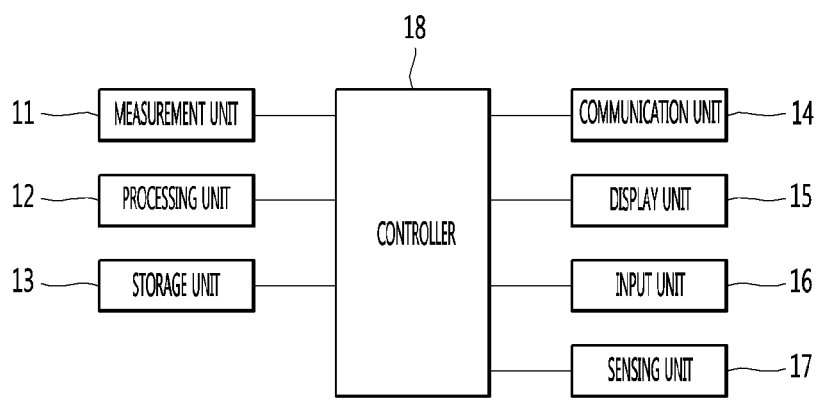
FIG. 4 is a block diagram showing the components of an energy management apparatus according to an embodiment of the present invention.

FIG. 4 is a block diagram showing the components of an energy management apparatus according to an embodiment of the present invention.

Referring to FIG. 4, the energy management apparatus 10 according to the embodiment of the present invention may include a measurement unit 11, a processing unit 12, a storage unit 13, a communication unit 14, a display unit 15, an input unit 16, a sensing unit 17, and a controller 18.

The measurement unit 11 measures and monitors the power state information of each device. The power state information of the device means information indicating the power state of the device configuring the smart grid 100. Here, the unit may include a power plant, an electric company, a distributed power source, an energy management system, an energy metering system or an electric apparatus. Examples of the power state information may include instantaneous power consumption, cumulative power consumption, cumulative power generation, per-cycle power consumption, per-cycle power generation, or allowable power amount.

In addition, the measurement unit 11 may monitor a current energy state (e.g., energy consumption per hour or a current rate state), the current state of the device (e.g., active, standby, or under maintenance), an operation mode state (e.g., charging or in use), a power quality state (e.g., frequency, neural voltage, harmonic state), an environmental condition (e.g., temperature, humidity, motion, wind, light intensity) and environmental impact (e.g., CO2 emission). Power state information measured by the measurement unit 11 may be output to the processing unit 12 or the controller 18 or may be transmitted to another energy management apparatus 10 through the communication unit 14.

The processing unit 12 calculates energy consumption information using the power state information received from the measurement unit 11. The energy consumption information means information necessary to manage energy consumption of the user. Examples of the energy consumption information include energy cost of cumulative energy consumption, energy cost of instantaneous power consumption, energy cost per hour, energy cost for rate tiers/energy blocks, energy cost for time-of-use energy rates, cost for critical peak pricing, cost for capacity billing rates, cost due to billing factors (for example, taxes, rental rates or discount), cost according to user-defined parameters, cost according to history per cycle, the amount of power generated/consumed according to history per cycle, or environmental impact information (e.g., CO2 emission or predicted CO2 emission). The calculated energy consumption information may be displayed through the display unit 15 or transmitted to another energy management apparatus via the communication unit 14.

In addition, the processing unit 12 may count a pattern in order to extract a pattern for efficiently operating energy in the system. This will be described in detail below with reference to FIG. 5.

The storage unit 13 stores the power state information of each device measured through the measurement unit 11 or energy consumption information calculated through the processing unit 12. The storage unit 13 may update the stored information at predetermined cycles. Specifically, the storage unit 13 may delete energy consumption information stored for a predetermined period or more and receive and store new energy consumption information at predetermined cycles. For example, the predetermined period in which the energy consumption information is stored may be three months and the cycle at which new energy consumption information is received may be one day. However, this is merely an example, and the present invention is not limited thereto.

In addition, the storage unit 13 may store various types of information for efficiently operating the energy in the system. For example, the storage unit 13 may store an energy control database for season (spring/autumn, summer and winter) or usage and thus the controller 18 may select any one from the stored energy database as necessary to conveniently control the energy in the system. In another example, the storage unit 13 may store information related to at least one temporary pattern for extracting an energy operation pattern. This will be described in detail below with reference to FIG. 5.

The communication unit 14 may be wired or wireless and may transmit information output from the measurement unit 11, the processing unit 12 and the controller 18 to another energy management apparatus 10 or transmit information received from another energy management apparatus 10 to the measurement unit 11, the processing unit 12, the storage unit 13 and the controller 18. The communication unit 14 may be a simple communication line or a power line communication means. The power line communication means may include a communication device (e.g., a modem, etc.) connected to two components. In another example, the communication unit 14 may be ZigBee, Wi-Fi, Bluetooth, etc.

The display unit 15 displays information necessary for energy management. Specifically, the display unit 15 may display the operation state of each device or reset information capable of setting initialization of each device. For example, the display unit 15 may provide alarm information (e.g., an alarm indicating limit price information and an event message) and display detailed information of each device (e.g., device type, model name, default setting, and battery lifespan).

In addition, the display unit 15 may display power state information of the device measured by the measurement unit 11, energy consumption information calculated by the processing unit 12 or information received by the communication unit 14. The display unit 15 may display energy related information transmitted through the controller 18. For example, the controller 18 may transmit an energy supply pattern, an energy consumption pattern, an energy warning signal or an energy operation schedule analyzed using various types of information stored in the storage unit 13 to the display unit 15. In addition, the display unit 15 may display a user command received through the input unit 16.

The input unit 16 may receive a user command necessary for energy management. For example, the input unit 16 may receive a user command for controlling the energy supply device or the energy consumption device or receive a display command indicating energy flow of the smart grid 100 or a local energy system. In another example, the input unit 16 may receive a command for inputting various types of setting information necessary to control the energy management apparatus 10.

The input unit 16 may transmit user input information to the measurement unit 11, the processing unit 12 or the controller 18.

The sensing unit 17 may sense a control signal of at least one energy device configuring the system. The energy device means a device for generating or consuming energy. For example, if the energy management apparatus 10 is included in the power system for the place of use 130, the energy device includes an energy supply device (solar photovoltaic power generator, a wind power generator, a fuel cell, a centralized power source and an ESS) and an energy consumption device (an electronic apparatus). The sensing unit 17 may sense a control signal of such an energy device. The control signal may include a power on/off signal, an operation mode setting signal, etc.

The controller 18 controls overall operation necessary for operation of the energy management apparatus 10. The controller 18 may control operation of another component configuring the energy management apparatus 10.

The controller 18 controls the energy management apparatus 10 based on an input signal. For example, the controller 18 may control on/off of an electric load or may control on/off of an electric load according to time interval settings. The controller 18 may perform more accurate control according to user settings within a predetermined threshold. In addition, the controller 18 may restrict the operation mode according to a threshold, a set value or a price point. For example, upon reaching a certain price point during operation of a standard mode, the standard mode may be restricted and converted into an conservation mode. The controller 18 outputs a control command optimal for efficient power consumption based on input information received from the input unit 16.

In addition, the controller 18 may control an energy device in the system. For example, the controller 18 may turn the energy device in the system on or off or control the operation mode of the energy device.

Hereinafter, a method of operating the system at the energy management apparatus 10 according to the embodiment of the present invention will be described with reference to FIGS. 5 to 15. Specifically, the method of extracting a control pattern of the energy device in the system and applying the extracted pattern to a system operation schedule at the energy management apparatus 10 according to the embodiment of the present invention will be described.

Hereinafter, the system means a local area system or a global area system to which the energy management apparatus 10 belongs.

Figure 5:
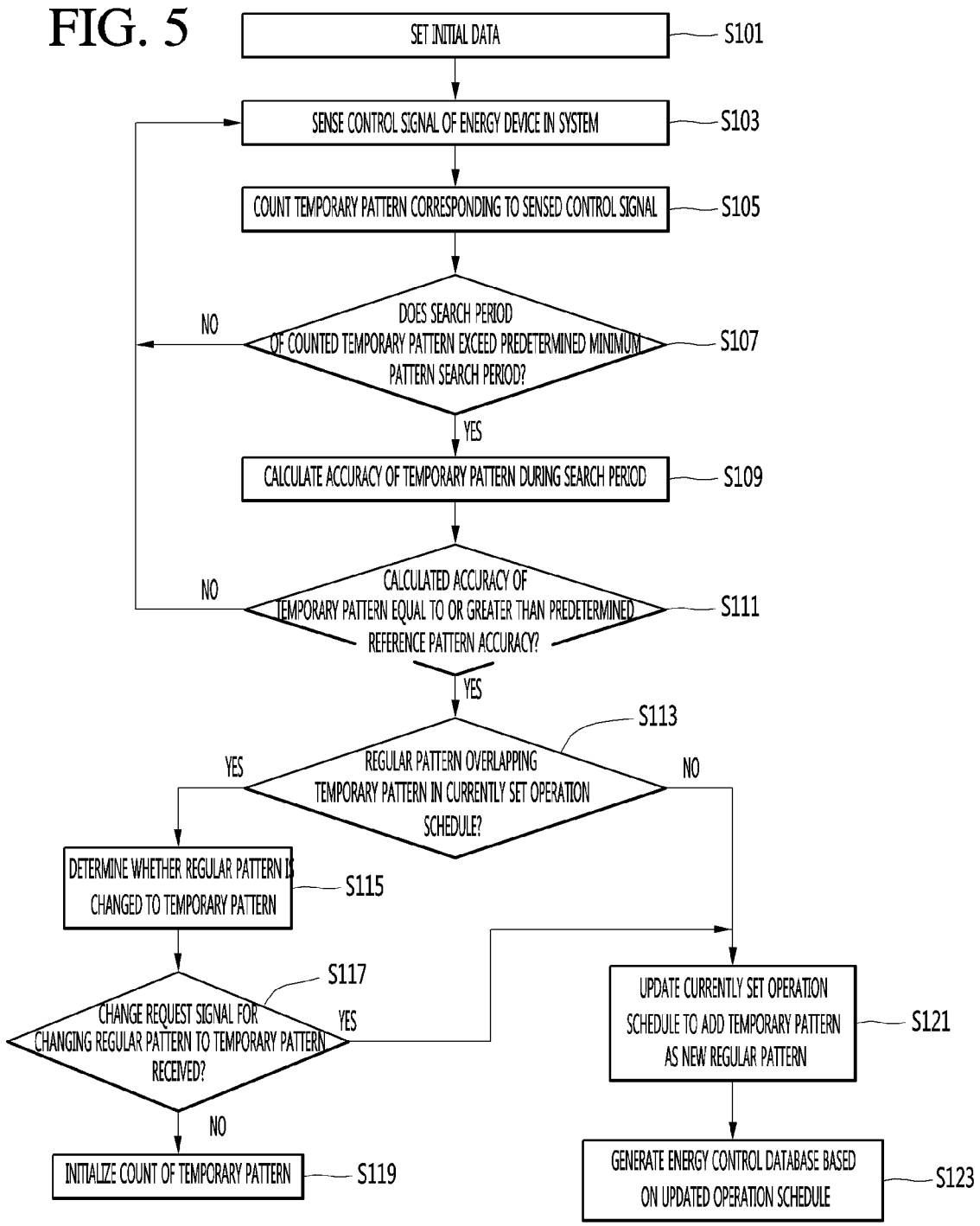
FIG. 5 is a flowchart illustrating a method of extracting a pattern of an energy device in a system and applying the pattern to a schedule at an energy management apparatus according to an embodiment of the present invention.

FIG. 5 is a flowchart illustrating a method of extracting a pattern of an energy device in a system and applying the pattern to a schedule at an energy management apparatus according to an embodiment of the present invention.

The control pattern of the energy device is extracted because time slots in which energy devices are mainly used may differ. For example, an energy device for generating power using solar light may mainly operate during the daytime and the ESS may mainly operate during the nighttime. The energy management apparatus 10 extracts the control patterns of the energy devices having different operation time slots and controls automatic operation of the energy devices.

First, the controller 18 may set initial data (S101).

The initial data according to the embodiment of the present invention may include an operation schedule of the system and reference data for extracting the control pattern of the energy device in the system.

That is, the controller 18 may initially set an energy operation schedule, such that the energy device in the system automatically operates. In addition, the controller 18 may set a criterion for extracting the control pattern of the energy device, thereby ensuring repeatability and accuracy of operation of the energy device applicable to the system.

The controller 18 may receive the initial data through the input unit 16. Specifically, the display unit 15 may display an initial data setting screen, and the input unit 16 may receive the initial data through the initial data setting screen.

Figures 6, 7:
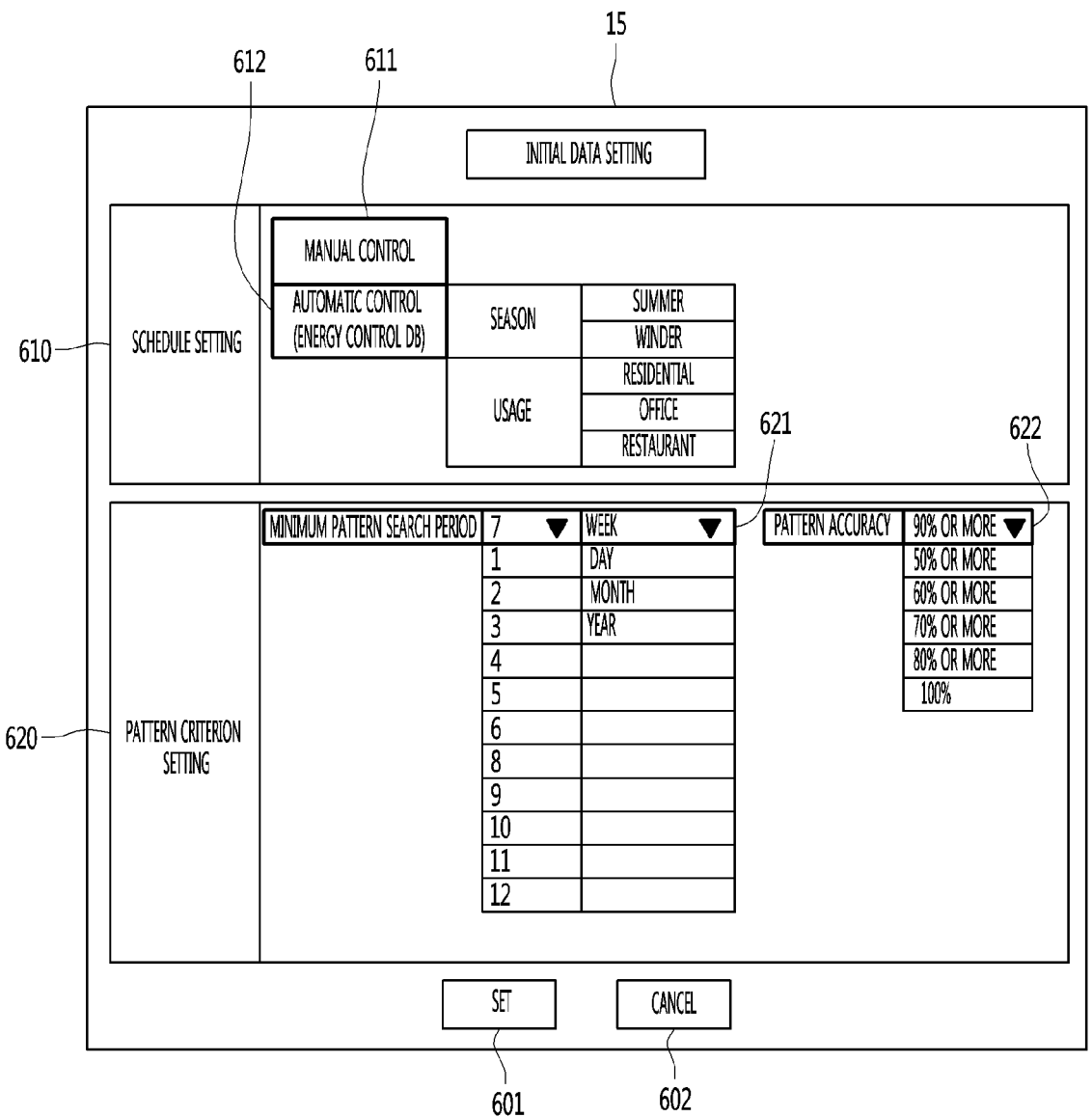
FIG. 6 is a diagram illustrating a method of setting initial data at an energy management apparatus according to an embodiment of the present invention.
FIG. 7 is a diagram illustrating a method of counting a temporary pattern and a method of setting a search period at an energy management apparatus according to an embodiment of the present invention.

Next, FIG. 6 is a diagram illustrating a method of setting initial data at an energy management apparatus according to an embodiment of the present invention.

The display unit 15 may display the initial data setting screen shown in FIG. 6. The initial data setting screen may include a schedule setting item 610 and a pattern criterion setting item 620.

First, the schedule setting item 610 will be described. The schedule setting item 610 refers to an item for setting an operation method for controlling the energy device in the system. The schedule setting item 610 may include a manual control item 611 and an automatic control item 612.

When a command for selecting the manual control item 611 is received, the controller 18 may control at least one energy device according to a user command. That is, the controller 18 may control the energy device according to the user command only when the user command is received through the input unit 16.

In contrast, when a command for selecting the automatic control item 612 is received, the controller 18 may control the energy device according to a predetermined schedule. That is, the controller 18 may control the energy device according to the predetermined schedule regardless of the user command.

To this end, the automatic control item 612 may include at least one operation schedule. The at least one operation schedule may be included in an energy control database and stored in the storage unit 13. For example, as shown in FIG. 6, the energy control database may include the operation schedule for each season or usage. The operation schedule for each season includes an operation schedule for spring/autumn, an operation schedule for summer and an operation schedule for winter, and the operation schedule for usage may include a residential operation schedule, an office operation schedule, and restaurant operation schedule. However, these are examples and other operation schedules may be further included or the above-described operation schedules may be omitted.

The energy control database may be generated through an algorithm shown in FIG. 5. That is, the operation schedule for each season or usage may be acquired by repeating operation of extracting an energy control pattern and applying the extracted pattern to the operation schedule, thereby generating the energy control database.

Accordingly, even if the user does not manually control the energy device or extract the pattern in the future, it is possible to easily operate the system by applying an appropriate operation schedule for each season or usage.

In addition, the operation schedule may be continuously updated. Specifically, the controller 18 may further receive a user command for manually controlling the energy device in a state in which the energy device is set to be automatically controlled through any one operation schedule. The controller 18 may control the energy device according to a manually input user command and extract a pattern based on the user command, thereby correcting the operation schedule.

The controller 18 may select any one of at least one operation schedule generated in this manner to automatically control the energy device in the system.

Next, the pattern criterion setting item 620 will be described. The pattern criterion setting item 620 refers to an item for setting a control pattern criterion applicable to the operation schedule. Specifically, a specific control repetition period and ratio may be set to determine whether to apply the pattern to the operation schedule.

Accordingly, the controller 18 may set a minimum period in which control operation is repeated to apply the pattern to the operation schedule through a minimum pattern search period item 621 and set a minimum repetition ratio of control operation to apply the pattern to the operation schedule through a pattern accuracy item 622. The minimum pattern search period item 621 may include a period item for selecting one of 1 to 12 and a period unit item for selecting one of day, week, month and year. The pattern accuracy item 622 may include an item capable of selecting any one of 50% or more, 60% or more to 90% or more and 100%. Therefore, the controller 18 may set the minimum pattern search period to seven weeks and set the pattern apparatus to 90% or more, but this merely an example. In addition, the minimum pattern search period and the pattern accuracy may be set using a method different from the above-described method.

Meanwhile, a method of applying the pattern to the operation schedule according to the set pattern search period and the pattern accuracy will be described in detail below.

A setting icon 601 and a cancellation icon 602 may be further included in addition to the initial data setting screen schedule setting item 610 and the pattern criterion setting item 620. When a command for selecting the setting icon 601 is received, the controller 18 may set the initial data according to selection in the schedule setting item 610 and the pattern criterion setting item 620. When a command for selecting the cancellation icon 602 is received, the controller 18 may delete the initial data setting displayed on the screen.

FIG. 5 will be described again.

The controller 18 may sense a control signal of the energy device in the system (S103).

As described above, the energy device may mean a device for supplying or consuming energy. The control signal of the energy device includes a power on/off signal and an operation mode setting signal of the energy device.

The sensing unit 17 may sense and transmit the control signal of the energy device to the controller 18.

The controller 18 may count a temporary pattern corresponding to the sensed control signal (S105).

When the control signal of the energy device is sensed, the controller 18 may determine whether the same signal as the sensed control signal is present in a previous period. The previous period may include a previous day, a previous week or a previous month of a day on which the control signal is sensed. Specifically, the controller 18 may determine whether the same control signal as the sensed control signal was sensed on the previous day, the same day of the previous week or the same date of the previous month.

Upon determining that the same control signal as the sensed control signal is sensed even in the previous period, the controller 18 may set the sensed control signal as a temporary pattern. When the temporary pattern corresponding to the sensed control signal is already set, the controller 18 may count the set temporary pattern.

The temporary pattern according to the embodiment of the present invention includes schedule information of a control signal which may be registered in the operation schedule according to the search period and accuracy and means the control pattern of the energy device. That is, the temporary pattern may include the name and control time of the energy device which may be registered in the operation schedule. Accordingly, if the energy devices are the same and the control times are different, the temporary patterns may be differently counted. Similarly, if the control times are the same and the energy devices are different, the temporary patterns may be separately counted.

When the control signal of the energy device is sensed, the controller 18 may determine whether a temporary pattern corresponding to the sensed control signal is present, generate a temporary pattern to start count when the temporary pattern is not present and increase the count number of the temporary pattern when the temporary pattern is present.

The controller 18 may determine whether the search period of the counted temporary pattern exceeds a predetermined minimum pattern search period (S107).

The search period according to the embodiment of the present invention means a period in which the temporary pattern is counted. Specifically, the search period may a period from a date on which the temporary pattern starts to be counted to a date on which the temporary pattern is counted last The predetermined minimum pattern search period may mean the minimum pattern search period set in step S101.

Accordingly, the controller 18 may determine whether the search period of the counted temporary pattern exceeds the predetermined minimum pattern search period.

When the search period of the counted temporary pattern is less than the predetermined minimum pattern search period, the controller 18 may return to step S103. That is, when the search period of the counted temporary pattern is less than the predetermined minimum pattern search period, the controller 18 may sense the control signal of the energy device in the system again.

Therefore, the energy management apparatus 10 can reliably extract the control pattern of the energy device. In a detailed example, when the control signal is sensed at the same time slot for one month or more, the same control signal is highly likely to be continuously sensed at the same time slot as compared to the case where the control signal is sensed at the same time slot for one week. Accordingly, the energy management apparatus 10 may perform control to perform continuous search without extracting a regular pattern when the temporary pattern is searched for less than the predetermined minimum pattern search period, thereby increasing reliability of the control signal pattern for registration in the operation schedule.

Accordingly, when the search period of the counted temporary pattern exceeds the predetermined minimum pattern search period, the controller 18 may determine whether to apply the pattern to the operation schedule of the system.

When the search period of the counted temporary pattern exceeds the predetermined minimum pattern search period, the controller 18 may calculate accuracy of the temporary pattern during the search period (S109).

Accuracy of the temporary pattern according to the embodiment of the present invention may mean a repetition ratio of the control signal corresponding to the temporary pattern during the search period. The search period may not mean everyday but may mean a sum of the control signals corresponding to the temporary patterns.

Hereinafter, a method of counting the temporary pattern, a method of setting a search period and a method of calculating accuracy at the energy management apparatus 10 according to the embodiment of the present invention will be described with reference to FIGS. 7 and 8.

FIG. 7 is a diagram illustrating a method of counting a temporary pattern and a method of setting a search period at an energy management apparatus according to an embodiment of the present invention, and FIG. 8 is a diagram illustrating a method of calculating accuracy of a temporary pattern at an energy management apparatus according to an embodiment of the present invention.

As shown in FIG. 7, the storage unit 13 may store the count number and the search period of each temporary pattern in association with at least one temporary pattern. The count number means the number of repetitions of the control signal corresponding to the temporary pattern during the search period. At this time, when the control signal is sensed in a state in which an error time according to a predetermined ratio is included in the schedule time of the temporary pattern, the temporary pattern may be counted. The error time may be set when the initial data is set in step S101.

The search period means a period means a period from a date on which the temporary pattern starts to be counted to a date on which the temporary pattern is counted last.

Referring to FIG. 7, for example, a first temporary pattern was counted 34 times from Nov. 17, 2016 to Dec. 26, 2016, a second temporary pattern was counted 5 times from Nov. 25, 2016 to Dec. 23, 2016, and a third temporary pattern was counted 9 times from Nov. 5, 2016 to Dec. 25, 2016. The dates on which each temporary pattern is counted is shown in FIG. 8.

Referring to FIG. 8, the first temporary pattern may indicate the schedule information of the control signal sensed every weekday, the second temporary pattern may indicate the schedule information of the control signal sensed every Friday, and the third temporary pattern may indicate the schedule information of the control signal sensed every weekend. The day and time information in which the temporary pattern is counted may be more accurately acquired as the search period of the temporary pattern increases.

Meanwhile, the method of calculating the accuracy of the temporary pattern will be described with reference to FIG. 8. The accuracy of the temporary pattern may be calculated by a ratio of the number of times of actually sensing the control signal to the number of times of sensing the control signal of the energy device corresponding to the temporary pattern during the search period.

For example, in the first temporary pattern, the number of times of sensing the control signal of the energy device from Nov. 17, 2016 to Dec. 26, 2016 is 36, which is the number of weekdays. At this time, the number of times of actually sensing the control signal is 34, because the control signal is not detected on Nov. 23, 2018 and Dec. 16, 2016. Accordingly, the accuracy of the first temporary pattern may be about 94.4%.

In the second temporary pattern, the number of times of sensing the control signal of the energy device from Nov. 25, 2016 to Dec. 23, 2016 is 5 which is the number of Fridays. At this time, the number of times of actually sensing the control signal is 5. Accordingly, the accuracy of the second temporary pattern may be about 100%.

In the third temporary pattern, the number of times of sensing the control signal of the energy device from Nov. 5, 2016 to Dec. 25, 2016 is 16, which is the number of Saturdays and Sundays. At this time, the number of times of actually sensing the control signal is 9. Accordingly, the accuracy of the third temporary pattern may be about 56.3%.

When the accuracy of the temporary pattern is calculated by the ratio of the number of times of actually sensing the control signal to the number of times of sensing the control signal of the energy device during the search period, it is possible to more accurately determine whether the control signal corresponding to the temporary pattern is regularly sensed.

However, the above-described method of calculating the accuracy of the temporary pattern is merely an example, and the other methods may be used.

FIG. 5 will be described again.

The controller 18 may determine whether the calculated accuracy of the temporary pattern is equal to or greater than predetermined reference pattern accuracy (S111).

The calculated accuracy of the temporary pattern was described with reference to FIG. 8.

The predetermined reference pattern accuracy may be set as the initial data in step S101.

Upon determining that the calculated accuracy of the temporary pattern is less than the predetermined reference pattern accuracy, the controller 18 may control the process to return to step S103. Meanwhile, accordingly, when the calculated accuracy of the temporary pattern is equal to or greater than the predetermined reference pattern accuracy, the controller 18 may determine that the temporary pattern is applicable to the operation schedule of the system and perform control the temporary pattern to be applied to the operation schedule.

Therefore, it is possible to reduce error or omission in the system operation, by calculating the accuracy of the temporary pattern, comparing the calculated accuracy with reference pattern accuracy and registering the accuracy in the operation schedule.

Although the controller 18 determines whether the calculated accuracy is equal to or greater than the reference pattern accuracy when the search period of the temporary pattern exceeds the predetermined minimum pattern search period in the above description, the order of the step of determining the minimum pattern search period and the step of determining reference pattern accuracy may be changed. That is, the controller 18 may determine whether the search period of the temporary pattern exceeds the minimum pattern search period when the accuracy of the temporary pattern is equal to or greater than the predetermined reference pattern accuracy.

In addition, the controller 18 may perform control to determine only any one of the minimum pattern search period and the reference pattern accuracy. In this case, it is possible to simplify the pattern extraction process.

In this manner, the controller 18 may determine whether the temporary pattern satisfies a predetermined criterion (at least one of the minimum pattern search period and the reference pattern accuracy). In addition, the controller 18 may update the operation schedule to add the temporary pattern according to the result of determination. Hereinafter, a method of updating the operation schedule will be described.

When the calculated accuracy of the temporary pattern is equal to or greater than the predetermined reference pattern accuracy, the controller 18 may determine whether a regular pattern overlapping a temporary pattern is present in a currently set operation schedule (S113).

The regular pattern may include the schedule information of at least one energy device registered in the operation schedule.

The controller 18 may determine whether control of the same energy device is scheduled at a time overlapping the operation time of the energy device according to the temporary pattern in the currently set operation schedule.

Next, the method of determining whether the regular pattern overlapping the temporary pattern is present in the operation schedule at the energy management apparatus according to the embodiment of the present invention will be described with reference to FIGS. 9 to 10. Specifically, FIG. 9 is a diagram illustrating a system operation schedule according to an embodiment of the present invention, and FIG. 10 is a diagram illustrating a method of determining whether a regular pattern overlapping a temporary pattern is present in a system operation schedule according to an embodiment of the present invention.

Figure 9:
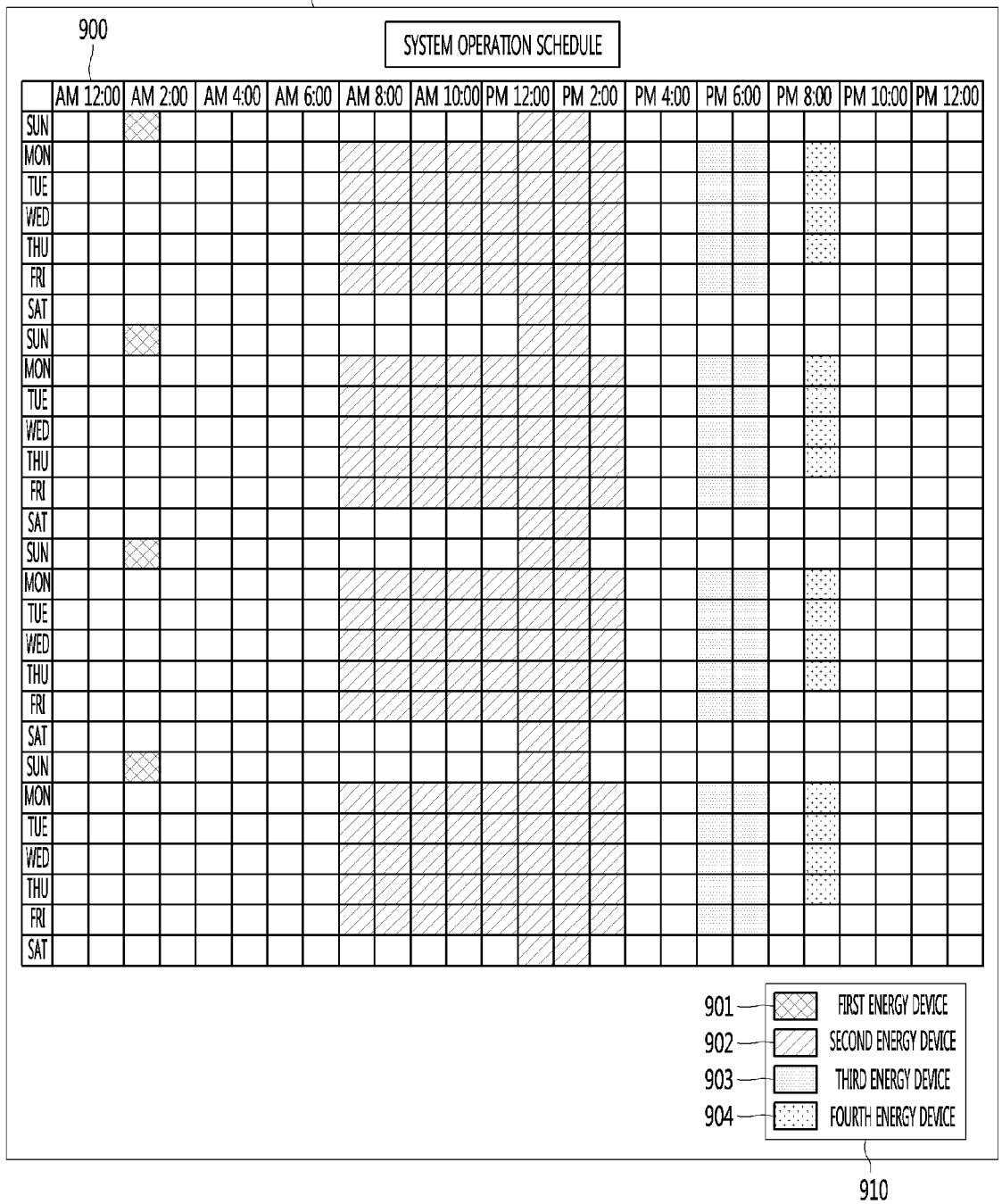
FIG. 9 is a diagram illustrating a system operation schedule according to an embodiment of the present invention.
Figure 10:
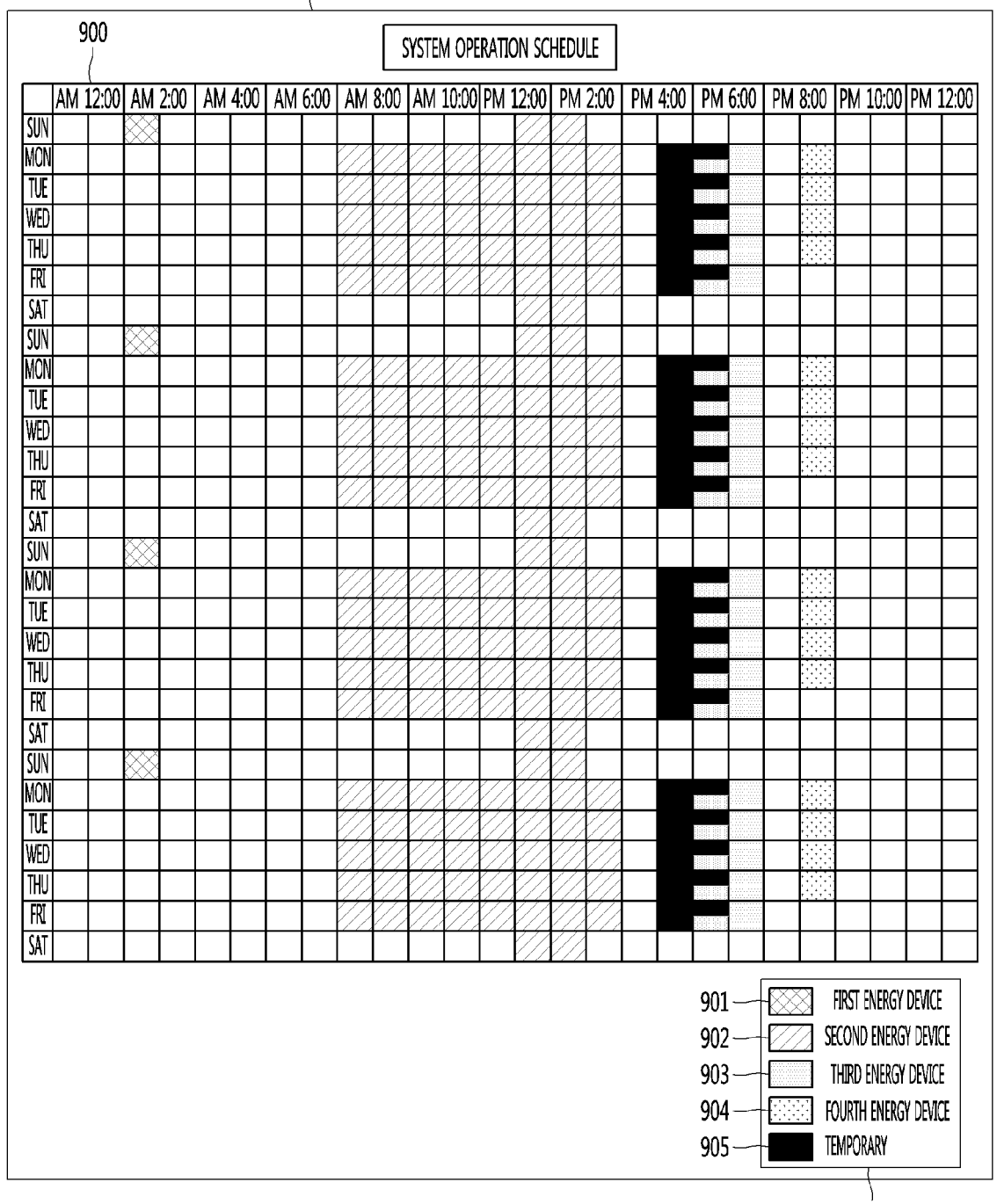
FIG. 10 is a diagram illustrating a method of determining whether a regular pattern overlapping a temporary pattern is present in a system operation schedule according to an embodiment of the present invention.

First, referring to FIG. 9, the display unit 15 may display an operation schedule 900. The operation schedule 900 represents the operation time of at least one energy device configuring the system.

Specifically, as shown in FIG. 9, the operation schedule 900 may be displayed on a monthly basis. That is, the operation schedule 900 may display a time when at least one energy device is turned on/off on a hourly basis during one month (four weeks), using icons 901 to 904.

The device icons 901 to 904 may differ between the energy devices. Accordingly, the display unit 15 may further display a device icon window 910 explaining the device icon matching each energy device.

According to the example of the operation schedule 900 shown in FIG. 9, it can be seen that the first energy device operates every Sunday AM 2:00 to AM 3:00, the second energy device operates every weekday AM 8:00 to PM 4:00 and every weekend PM 1:00 to PM 3:00, the third energy device operates every weekday PM 6:00 to PM 8:00, and the fourth energy device operates every Monday to Thursday PM 9:00 to PM 10:00.

Through such an operation schedule 900, the user can easily confirm the operation state of the energy device in the system.

The operation schedule 900 shown in FIG. 9 is an example and may be displayed on a daily basis or on a weekly basis or the other method may be used instead of the device icons 901 to 904.

Meanwhile, the controller 18 may determine whether the regular pattern included in the operation schedule 900 overlaps the temporary pattern prior to addition of the temporary pattern to the operation schedule 900.

Referring to FIG. 10, a temporary icon 905 may be a temporary pattern satisfying the predetermined minimum pattern search period and the pattern accuracy. The temporary pattern according to the temporary icon 905 may include information on the third energy device operating every weekday PM 5:00 to PM 7:00. In this case, it can be seen that the controller 18 may determine that the temporary pattern partially overlaps the regular pattern in which the third energy device operates on PM 6:00 to PM 8:00.

As shown in FIG. 10, the controller 18 may display the device icon 903 of the third energy device and the temporary icon 905 at the same time slot to indicate that the regular pattern and the temporary pattern overlap each other.

The controller 18 may compare the schedule information of the regular pattern included in the operation schedule 900 with the schedule information of the temporary pattern to determine whether the regular pattern and the temporary pattern overlap each other.

FIG. 5 will be described again.

When the regular pattern overlapping the temporary pattern is present in the currently set operation schedule 900, the controller 18 may determine whether the regular pattern is changed to a temporary pattern (S115).

For example, the controller 18 may display a window for checking whether the pattern is changed, receives a response thereto and determine whether the regular pattern is changed to the temporary pattern.

The controller 18 may determine whether a change request signal for changing the regular pattern to the temporary pattern is received (S117).

That is, the controller 18 may determine whether the change request signal is received through the window for checking whether the pattern is changed.

Upon determining that the change request signal is received, the controller 18 may update the currently set operation schedule 900 such that the temporary pattern is added as a new regular pattern (S121).

In contrast, upon determining that the change request signal is not received, the controller 18 may initialize the count of the temporary pattern (S119).

Initialization of the count of the temporary pattern may include operation of deleting the temporary pattern or setting the count of the temporary pattern to 0. Therefore, in order to extract the same control pattern of the energy device as the initialized temporary pattern, a new count should start.

Next, an operation method when the regular pattern overlapping the temporary pattern is present in the operation schedule according to the embodiment of the present invention will be described with reference to FIGS. 11A to 11C, FIGS. 12A to 12C and FIG. 13.

Figure 11A:
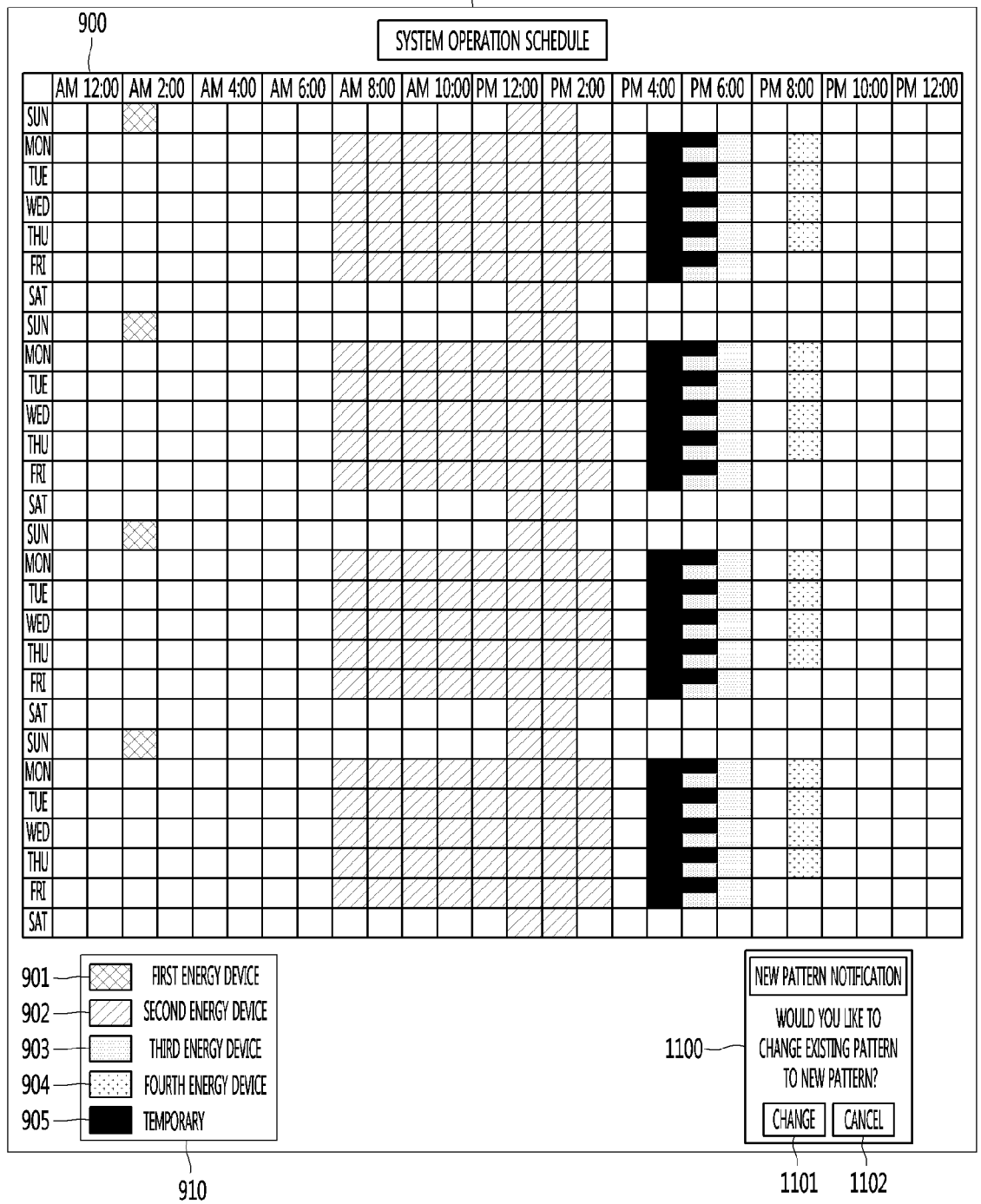
FIGS. 11A to 11C are diagrams illustrating a method of operating an energy management apparatus when a regular pattern overlapping a temporary pattern is present in an operation schedule according to a first embodiment of the present invention.
Figure 11B:
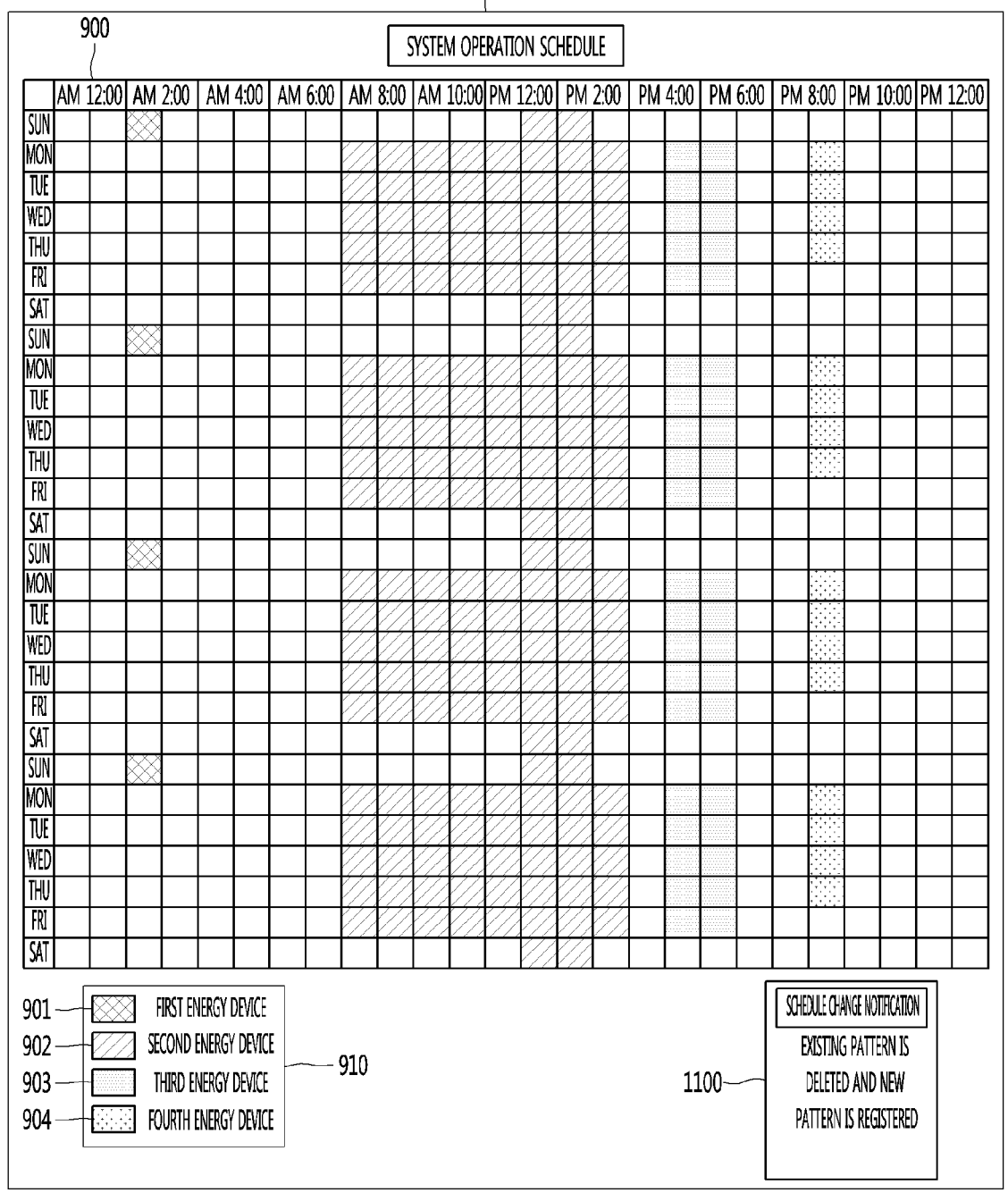
Figure 11C:
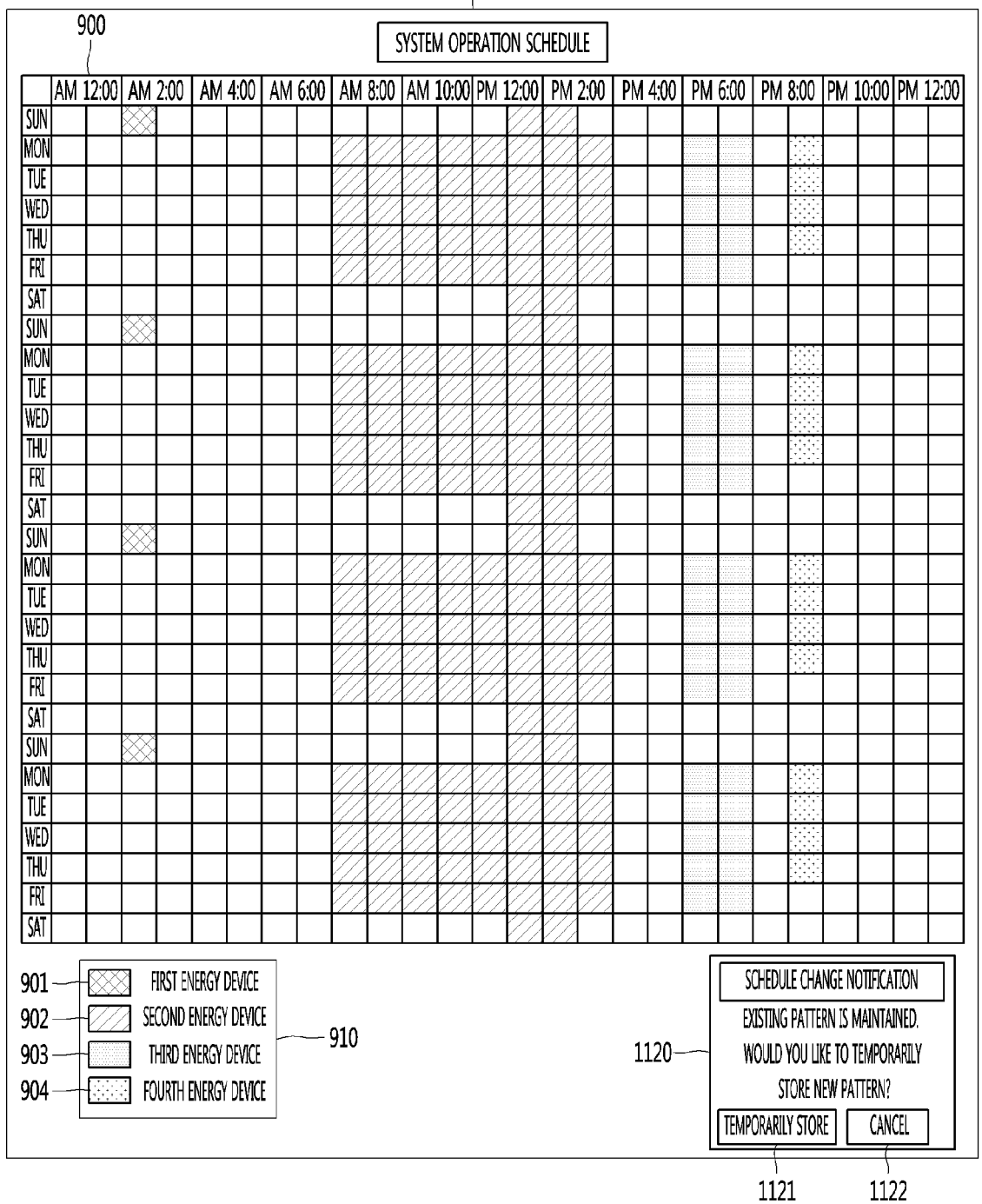

First, FIGS. 11A to 11C are diagrams illustrating a method of operating an energy management apparatus when a regular pattern overlapping a temporary pattern is present in an operation schedule according to a first embodiment of the present invention.

When the regular pattern overlapping the temporary pattern is present in the operation schedule, the controller 18 determine whether the regular pattern is changed to the temporary pattern. Specifically, the controller 18 may display a pattern change confirmation window shown in FIG. 11A.

The pattern change confirmation window 1100 according to the embodiment of the present invention may include a message for checking whether the scheduled regular pattern is changed to a new temporary pattern.

When a command for selecting a change icon 1101 included in the pattern change confirmation window 1100 is received, the controller 18 may delete the regular pattern overlapping the temporary pattern from the operation schedule 900 and add the temporary pattern. In addition, the controller 18 may display a schedule change notification window 1110 shown in FIG. 11B. The schedule change notification window 1110 may include a message indicating that the regular pattern overlapping the temporary pattern is deleted and a new pattern is registered. In addition, referring to the operation schedule 900 shown in FIG. 11B, the operation time of the third energy device at PM 6:00~PM 8:00 as the regular pattern is deleted and the operation time of the third energy device at PM 5:00~PM 7:00 as the temporary pattern is added Meanwhile, when a command for selecting the cancellation icon 1102 included in the pattern change confirmation window 1100 shown in FIG. 11A is received, the controller 18 may initialize the count of the temporary pattern without changing the operation schedule 900.

In addition, the controller 18 may display a schedule maintenance notification window 1120 shown in FIG. 11C. The schedule maintenance notification window 1120 may include a message indicating that the regular pattern has not been changed to the temporary pattern.

In addition, the schedule maintenance notification window 1120 may include a message for checking whether schedule information corresponding to the temporary pattern is stored. The controller 18 may store the schedule information corresponding to the temporary pattern in the storage unit 13 when a command for selecting a temporary storage icon 1121 is received and delete the schedule information corresponding to the temporary pattern when a command for selecting the cancellation icon 1122 is received.

Referring to the operation schedule 900 shown in FIG. 11C, the operation time of the third energy device at PM 6:00 to PM 8:00 as the regular pattern is maintained and the schedule information according to the temporary pattern is not applied.

Even if the temporary pattern is not immediately applied to the operation schedule 900, the user can conveniently apply the temporary pattern to the operation schedule when necessary, by temporarily storing the schedule information.

Figure 12A:
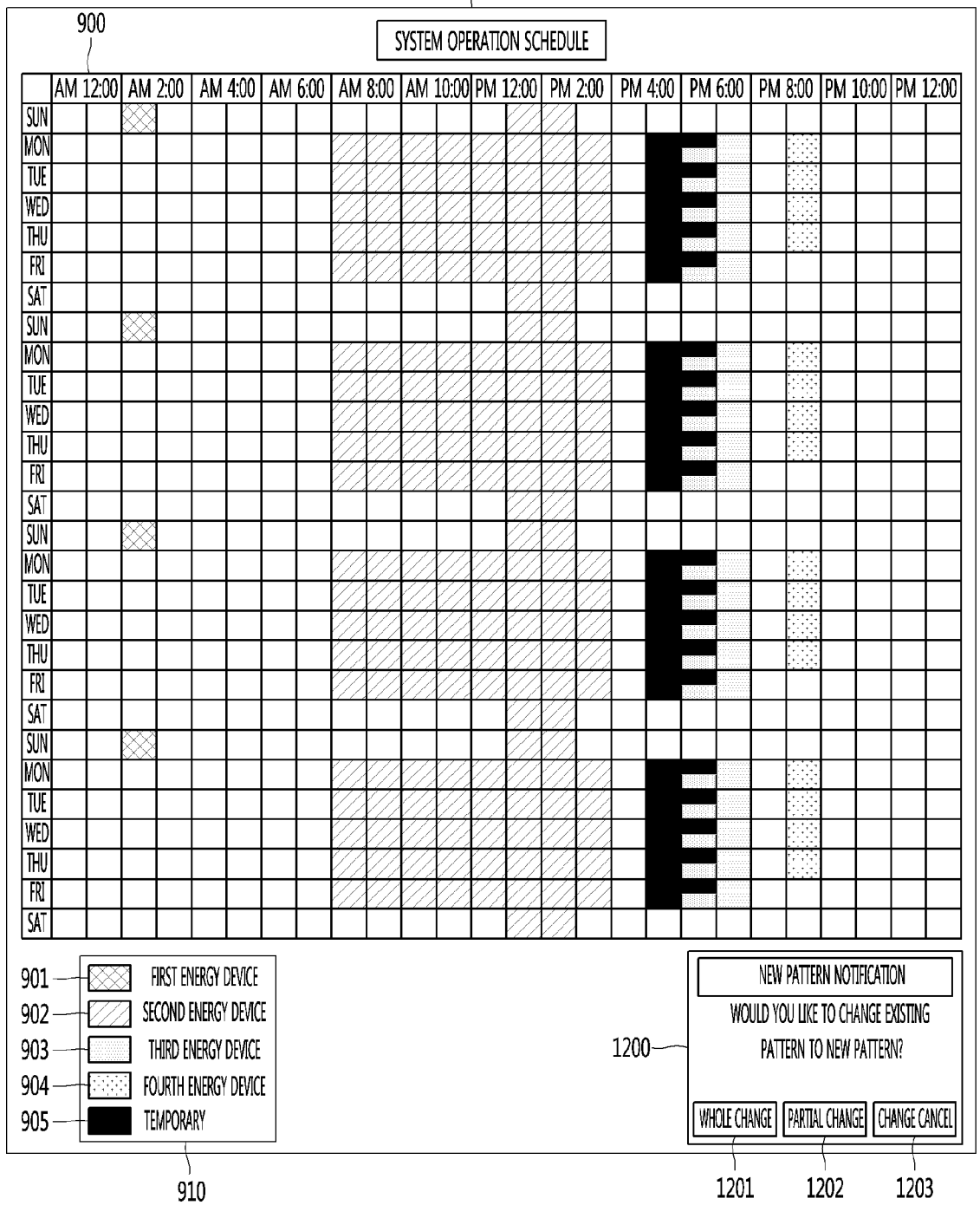
FIGS. 12A to 12C are diagrams illustrating a method of operating an energy management apparatus when a regular pattern overlapping a temporary pattern is present in an operation schedule according to a second embodiment of the present invention.
Figure 12B:
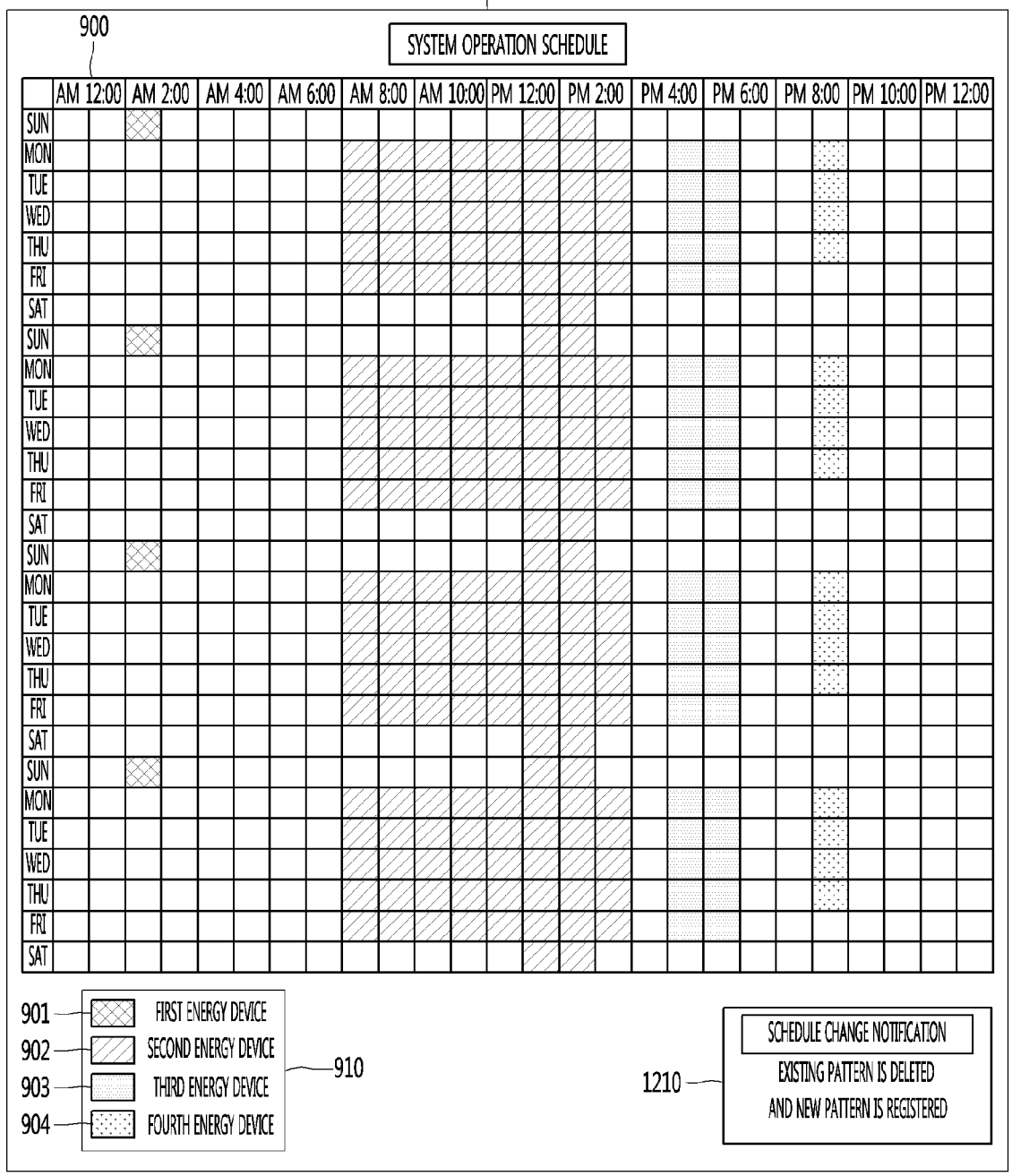
Figure 12C:
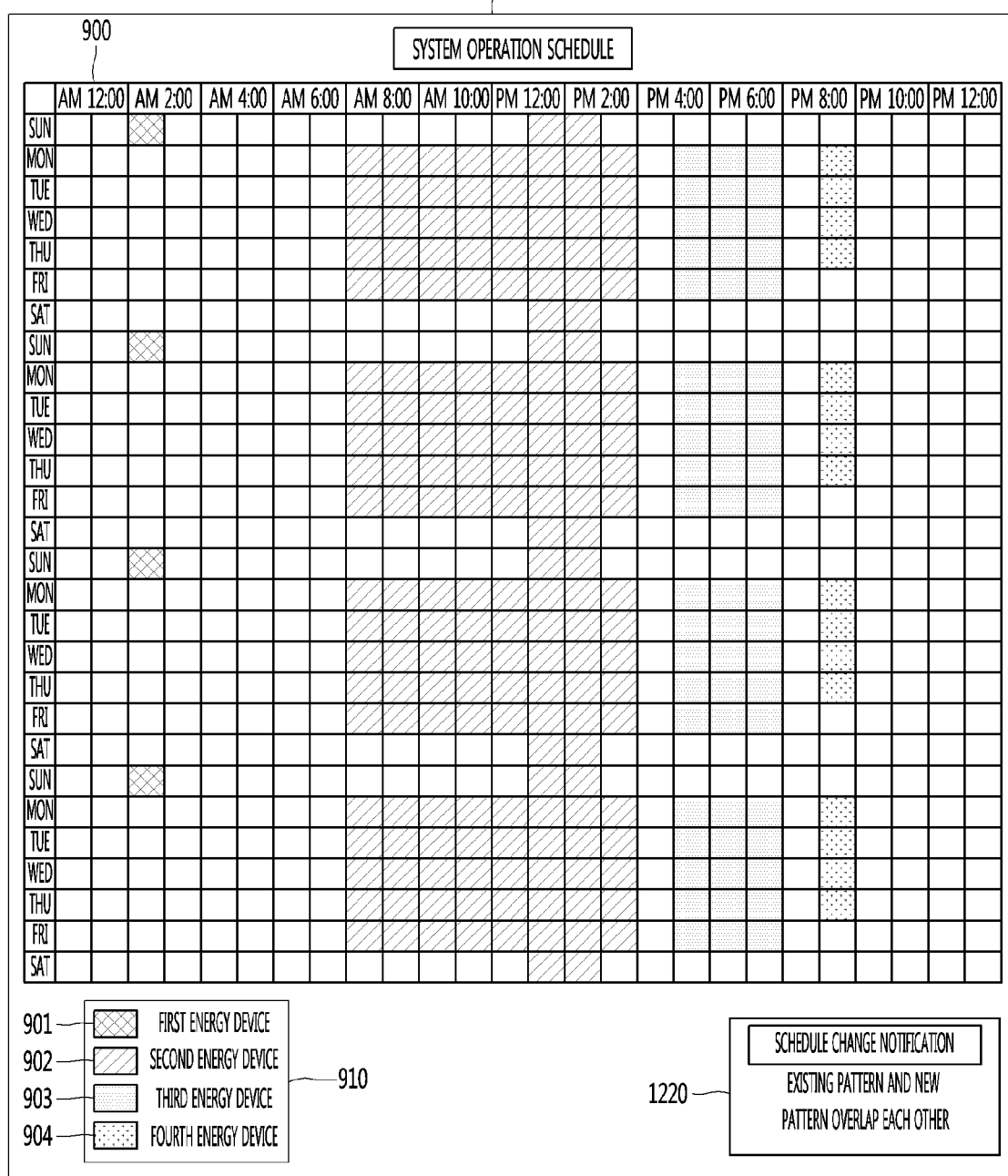

Next, FIGS. 12A to 12C are diagrams illustrating a method of operating an energy management apparatus when a regular pattern overlapping a temporary pattern is present in an operation schedule according to a second embodiment of the present invention.

The controller 18 may display a pattern change confirmation window 1200 shown in FIG. 12A to determine whether the regular pattern is changed to the temporary pattern.

The pattern change confirmation window 1200 shown in FIG. 12A may include a whole change icon 1201, a partial change icon 1202 and a change cancellation icon 1203, unlike the pattern change confirmation window 1100 shown in FIG. 11A.

When a command for selecting the whole change icon 1201 is received, the controller 18 deletes the operation time of the third energy device at PM 6:00 to PM 8:00 as the regular pattern and adds the operation time of the third energy device at PM 5:00 to PM 7:00 as the temporary pattern like the operation schedule 900 shown in FIG. 12B. The controller 18 may display a schedule change notification window 1210. The schedule change notification window 1210 includes a message indicating that the regular pattern is deleted and a new temporary pattern is included in the operation schedule 900.

Meanwhile, when a command for selecting the partial change icon 1202 in the pattern change confirmation window 1200 shown in FIG. 12A is received, the controller 18 may update the operation schedule 900 such that the regular pattern and a partial pattern including the overlapping time are included. That is, referring to FIG. 12C, the operation time of the third energy device at PM 6:00 to PM 8:00 corresponding to the regular pattern and the operation time of the third energy device at PM 5:00 to PM 7:00 corresponding to the temporary pattern are included in the operation schedule 900. In addition, the controller 18 may display a schedule overlapping change notification window 1220. The schedule overlapping change notification window 1220 includes a message indicating that both the regular pattern and the temporary pattern have been included in the operation schedule 900.

Meanwhile, when a command for selecting the change cancellation icon 1203 in the pattern change confirmation window 1200 shown in FIG. 12A is received, the controller 18 may initialize the count of the temporary pattern without changing the operation schedule 900. That is, the controller 18 may display the schedule maintenance notification window 1120 as described with reference to FIG. 11C. A repeated description will be omitted.

According to the second embodiment of the present invention, it is possible to provide a method of enabling the user to select whether the operation schedule 900 is maintained, whether a new temporary pattern is applied or whether overlapping is applied. Accordingly, the user can more efficiently manage the system using various methods.

Figure 13:
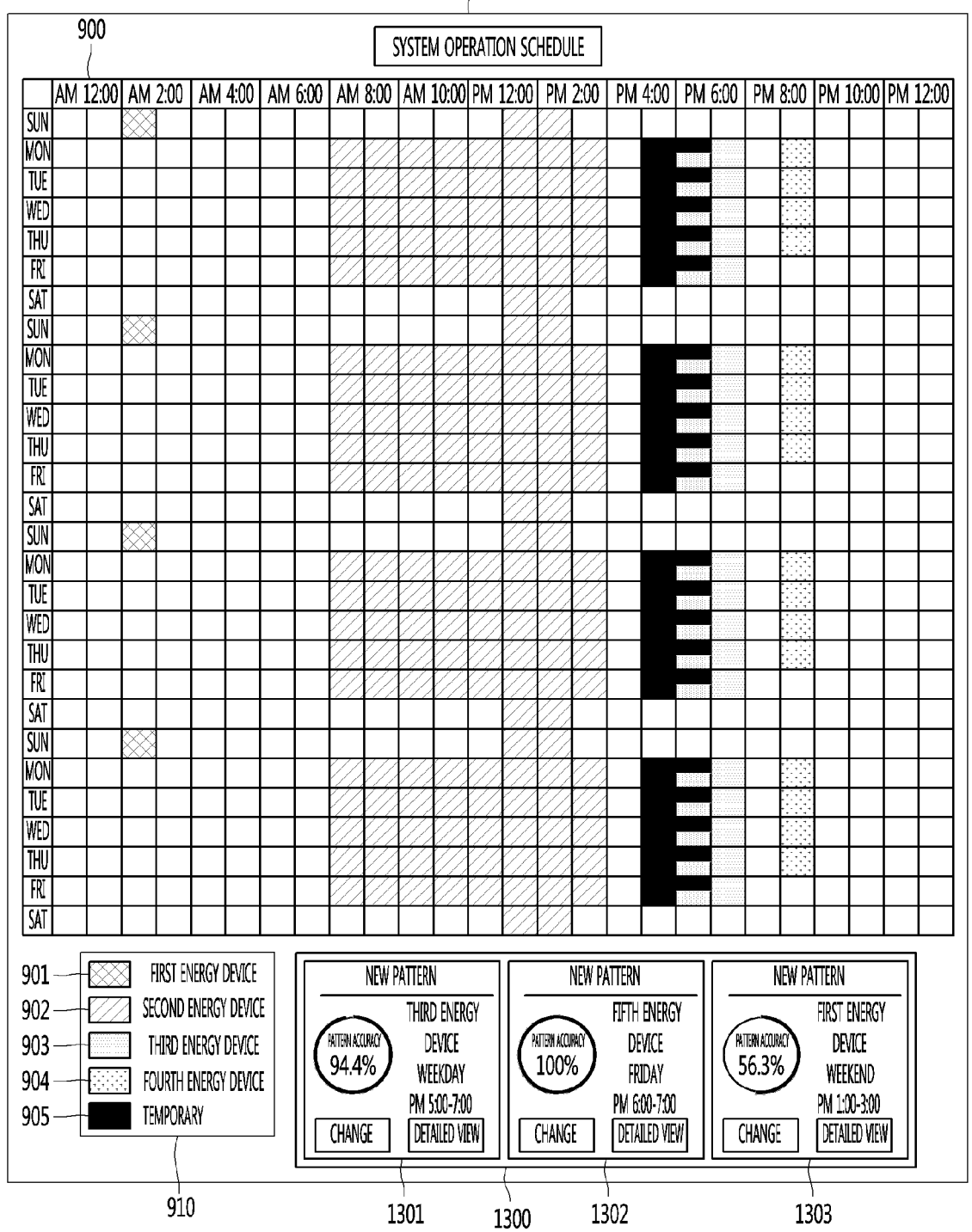
FIG. 13 is a diagram illustrating a method of operating an energy management apparatus when a regular pattern overlapping a temporary pattern is present in an operation schedule according to a third embodiment of the present invention.

Next, FIG. 13 is a diagram illustrating a method of operating an energy management apparatus when a regular pattern overlapping a temporary pattern is present in an operation schedule according to a third embodiment of the present invention.

When the regular pattern overlapping the temporary pattern is present in the operation schedule, the controller 18 may determine whether the regular pattern is changed to the temporary pattern. Specifically, the controller 18 may display a pattern list window 1300 shown in FIG. 13.

The pattern list window 1300 may include temporary pattern items 1301 to 1303 corresponding to at least one temporary pattern which is currently being counted. Accordingly, the pattern list window 1300 may include not only the temporary pattern satisfying the predetermined minimum pattern search period and pattern accuracy but also the temporary pattern which does not satisfy the minimum pattern search period or pattern accuracy.

For example, the first temporary pattern item 1301 may satisfy the predetermined minimum pattern search period and the reference pattern accuracy. In contrast, the second temporary pattern item 1302 may not satisfy the minimum pattern search period, and the third temporary pattern item 1303 may not satisfy the reference pattern accuracy.

By displaying not only the temporary pattern satisfying the minimum pattern search period and the reference pattern accuracy but also the temporary pattern which does not satisfy the minimum pattern search period and the reference pattern accuracy, it is possible to notify the user of the types of the temporary patterns which are currently being counted.

Meanwhile, the temporary pattern items 1301 to 1303 may include the name of the energy device, the schedule information of the energy device and pattern accuracy. In particular, the pattern accuracy may be displayed through a pie chart. Therefore, the user can easily acquire and select information on the temporary pattern applicable to the operation schedule 900.

In addition, the temporary pattern items 1301 to 1303 may further include a change icon and a detailed view icon and thus the controller 18 may perform control to apply the temporary pattern to the operation schedule 900 or display more information.

FIG. 5 will be described again.

Upon determining the regular pattern overlapping the temporary pattern is not present in the currently set operation schedule 900, the controller 18 may update the currently set operation schedule 900 such that the temporary pattern is added as a new regular pattern (S121).

That is, when the regular overlapping the temporary pattern is not present, the controller 18 may apply the temporary pattern to the operation schedule 900 without asking whether to change the pattern.

However, even if the regular pattern overlapping the temporary pattern is not present, the controller 18 may determine whether the temporary pattern is added to the operation schedule 900. For example, whether the temporary pattern is added to the operation schedule 900 may be determined through the pattern change confirmation window 1100 or 1200 shown in FIG. 11A or 12A or the pattern list window 1300 shown in FIG. 13.

Figure 14:
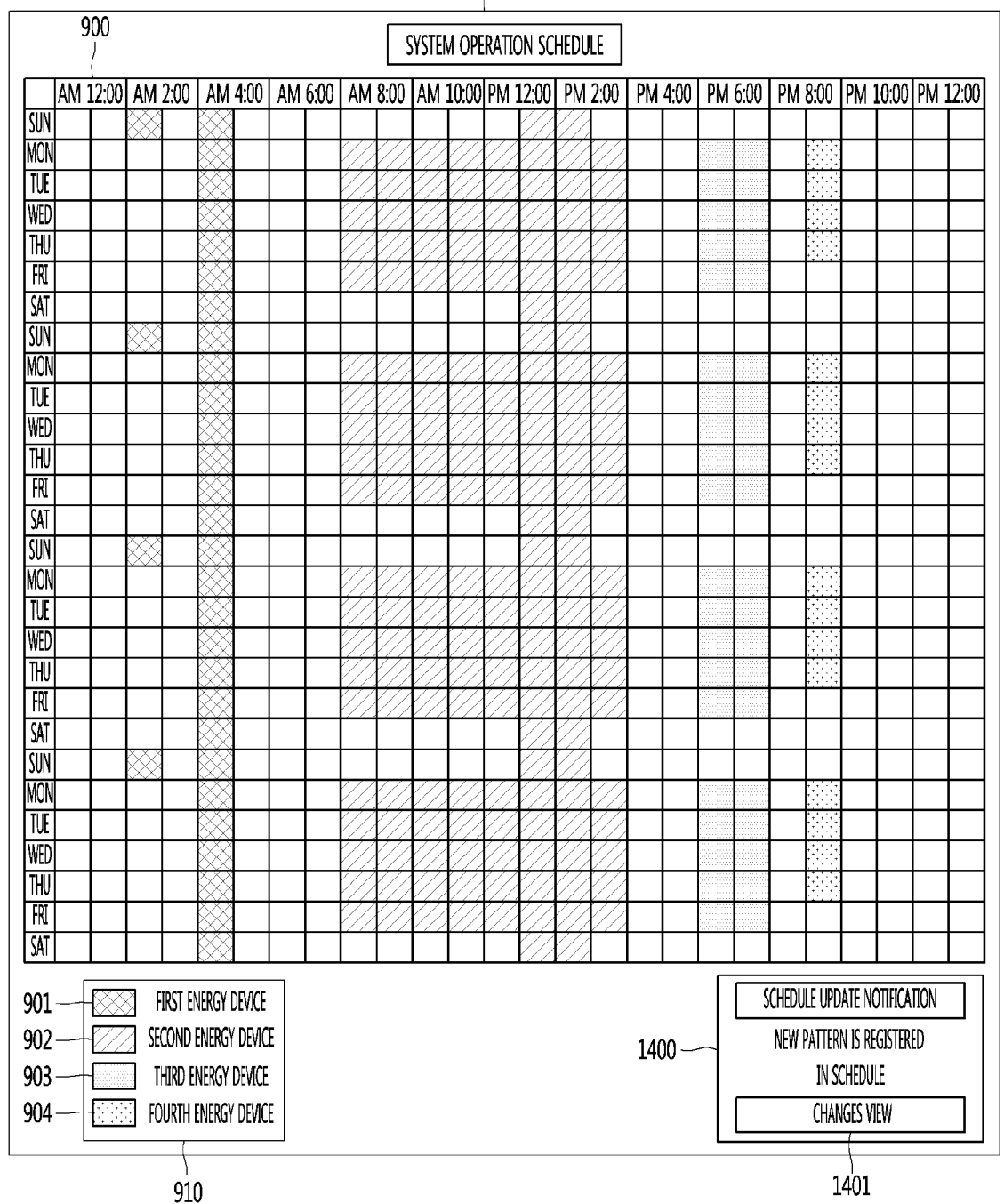
FIGS. 14 to 15 are diagrams illustrating a method of operating an energy management apparatus when a regular pattern overlapping a temporary pattern is not present in an operation schedule according to an embodiment of the present invention.
Figure 15:
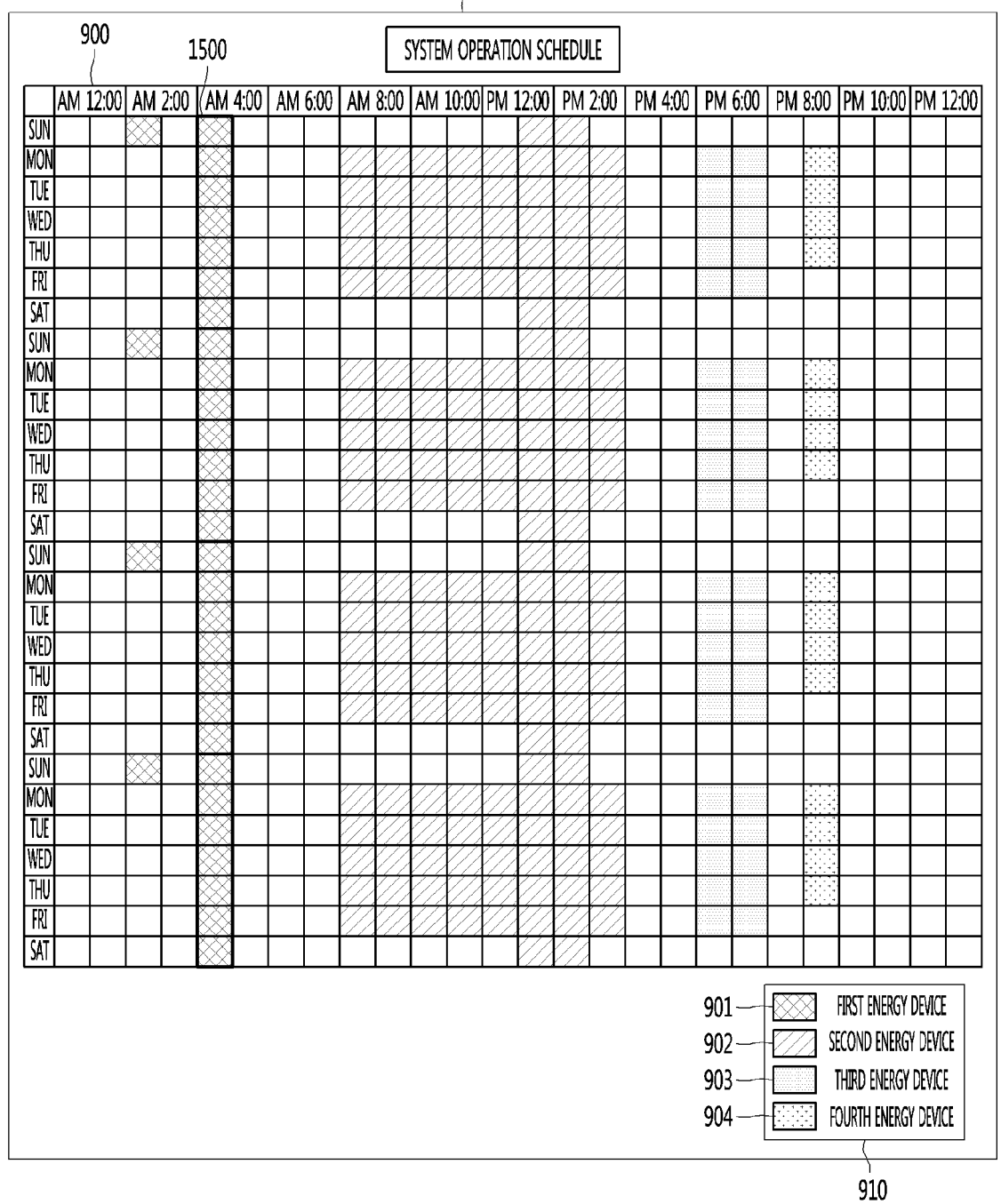

Next, FIGS. 14 to 15 are diagrams illustrating a method of operating an energy management apparatus when a regular pattern overlapping a temporary pattern is not present in an operation schedule according to an embodiment of the present invention.

When the regular overlapping the temporary pattern is not present in the operation schedule 900, the controller 18 may add the temporary pattern to the operation schedule 900. For example, as shown in FIG. 14, it can be seen that the operation time of the first energy device everyday AM 4:00 to AM 5:00 is added to the operation schedule 900.

In addition, the controller 18 may display a schedule immediate change notification window 1400. The schedule immediate change notification window 1400 may include a changes view icon 1401 along with a message indicating that the temporary pattern has been added to the operation schedule 900.

The changes view icon 1401 visually displays the update of the operation schedule 900 in an easy-to-understand manner. Accordingly, when a command for selecting the changes view icon 1401 is received, the controller 18 may overlap and display a change schedule and a highlight box 1500 as shown in FIG. 15. Therefore, the user can easily grasp the update information of the operation schedule 900.

FIG. 5 will be described again.

The controller 18 may generate the energy control database based on the updated operation schedule 900 (S123).

Specifically, the controller 18 may store the operation schedule 900 in the storage unit 13 whenever the operation schedule 900 is updated. Alternatively, the controller 18 may transmit the operation schedule 900 to an external server through the communication unit 14.

The storage unit 13 or the external server may classify and store the operation schedule 900 for each season or usage, thereby generating the energy control database. In addition, the updated operation schedule 900 may be further added to the generated energy control database, thereby continuously managing the energy control database.

The user can select any one operation schedule from the energy control database to control the energy device in the system, when setting the initial data of the system. Therefore, it is possible to remove the need for manual control required to efficiently manage the system in the beginning, thereby reducing workload. In addition, it is possible to reduce unnecessary energy consumption.

In addition, by extracting and registering the energy control pattern in the operation schedule, it is possible to prevent control of the energy device from being omitted. In addition, by visually displaying the operation schedule, the user can intuitively recognize the operation state of the system.

While the present invention has been particularly shown and described with reference to exemplary embodiments thereof, it should be understood by those skilled in the art that the invention is not limited to the disclosed exemplary embodiments but various modifications may be made without departing from the spirit and scope of the present invention. Such modifications should not be individually understood from the technical spirit or prospect of the present invention.

According to an embodiment of the present invention, the above-described method may be implemented as code that can be written to a processor-readable recording medium and can thus be read by a processor. Examples of the processor-readable recording medium include a ROM, a RAM, a CD-ROM, a magnetic tape, a floppy disk, an optical data storage device, etc.

The above-described energy management apparatus is not restrictively applied to the above-described energy management apparatus, but all or portions of the above-described embodiments may be selectively combined such that various modifications may be made.

The invention claimed is:

1. An energy management apparatus comprising:
    a storage unit configured to store an operation schedule of the energy management apparatus;
    a sensing unit configured to sense a control signal of at least one energy device in a system to which the energy management apparatus belongs; and
    a controller configured to count a temporary pattern corresponding to the sensed control signal to determine whether the temporary pattern satisfies a predetermined criterion and to update the operation schedule to add the temporary pattern based on the result of determination,
    wherein the controller determines whether a search period in which the temporary pattern is counted exceeds a predetermined minimum pattern search period, and determines that the temporary pattern is applicable to the operation schedule when the search period exceeds the predetermined minimum pattern search period.

2. The energy management apparatus according to claim 1, wherein the controller:
    determines whether the temporary pattern corresponding to the sensed control signal is present,
    generates and counts the temporary pattern corresponding to the sensed control signal when the temporary pattern is present, and
    increases the count of the temporary pattern when the temporary pattern is present.

3. The energy management apparatus according to claim 1, wherein the controller:
    determines whether accuracy of the temporary pattern is equal to or greater than predetermined reference pattern accuracy, and
    determines that the temporary pattern is applicable to the operation schedule when the accuracy of the temporary pattern is equal to or greater than the predetermined reference pattern accuracy.

4. The energy management apparatus according to claim 3, wherein the accuracy of the temporary pattern is calculated through a ratio of the number of times of actually sensing the control signal to a predetermined number of times of sensing a control signal of an energy device by the temporary pattern during the search period.

5. The energy management apparatus according to claim 3, further comprising an input unit configured to receive initial data for setting the minimum pattern search period and the reference pattern accuracy.

6. The energy management apparatus according to claim 1, wherein the storage unit generates an energy control database based on the updated operation schedule.

7. The energy management apparatus according to claim 6, wherein the controller selects any one operation schedule in the energy control database to control at least one energy device in the system.

8. The energy management apparatus according to claim 6, wherein the energy control database includes an operation schedule for each season or usage.

9. The energy management apparatus according to claim 1, further comprising a display unit configured to display a pattern change confirmation window for requesting addition of the temporary pattern.

10. The energy management apparatus according to claim 9, wherein the controller performs control to display the pattern change confirmation window when a regular pattern having an operation time overlapping that of the temporary pattern to be added is present in the operation schedule.

11. The energy management apparatus according to claim 10, wherein the pattern change confirmation window includes a whole change icon for deleting the regular pattern and adding the temporary pattern, a partial change icon for applying the temporary pattern to overlap the regular pattern, and a change cancellation icon for maintaining the regular pattern.

12. The energy management apparatus according to claim 10, wherein the controller performs control to initialize the count of the temporary pattern and to determine whether schedule information corresponding to the temporary pattern is stored, when a command for selecting the change cancellation icon in the pattern change confirmation window is received.

* * * * *